United States Patent [19]

Murakami et al.

[11] Patent Number: 5,522,041
[45] Date of Patent: May 28, 1996

[54] DATA PROCESSOR AND DATA TRANSFER METHOD

[75] Inventors: Tatsuya Murakami, Tachikawa; Eiichi Hadano, Yokohama; Kazuyuki Kodama, Fujisawa; Masaaki Fujinawa, Kanagawa-ken; Sunao Iwaki, Chigasaki, all of Japan

[73] Assignee: Hitachi, Ltd., Tokyo, Japan

[21] Appl. No.: 166,079

[22] Filed: Dec. 14, 1993

[30] Foreign Application Priority Data

Dec. 17, 1992 [JP] Japan .................................. 4-337195
May 17, 1993 [JP] Japan .................................. 5-114375

[51] Int. Cl.$^6$ .................................................. G06F 15/82
[52] U.S. Cl. .................... 395/200.01; 395/800; 395/2; 364/DIG. 1; 364/242.94; 364/222.6; 364/260
[58] Field of Search .................................. 395/800, 500, 395/133–136, 200, 725, 200.01

[56] References Cited

U.S. PATENT DOCUMENTS

| 5,418,953 | 5/1995 | Hunt et al. ............................... 395/650 |
| 5,420,967 | 5/1995 | Dalp ......................................... 395/133 |

FOREIGN PATENT DOCUMENTS 1-302472  12/1989  Japan .

OTHER PUBLICATIONS

"Image Information Compression", H. Harajima, Published by Ohm Sha Ltd.

Primary Examiner—Mehmet Geckil
Attorney, Agent, or Firm—Antonelli, Terry, Stout & Kraus

[57] ABSTRACT

A data processor and a data transfer method for efficiently transferring data between a plurality of information processing devices as in a client server system. In case non-coded data such as image data are transmitted, it is necessary to make the transmission management requirements such as protocol, data structure, coding scheme, and coding default condition coincide between the transmitting side and the receiving side. In order to satisfy this requirement, a data processor lying between a plurality of information processing devices and having a data transfer intermediary function records beforehand transmission management information including identification information concerning a plurality of clients, discriminates a client by using the identification information, and recognizes transmission management information concerning the discriminated client. In addition, the data processor analyzes transmission data supplied from the server, on the basis of the transmission management information, and converts it to transmission data conformed to the client.

7 Claims, 20 Drawing Sheets

FIG. 2

| IDENTIFIER | ADDRESS | PROTOCOL | DATA STRUCTURE | CODING SCHEME FLAG | CODING DEFAULT CONDITION |
|---|---|---|---|---|---|
| A | ABC | DCS | IPX | MH | RGB SYSTEM |
| B | ACD | DCS | SPX | MH | RGB SYSTEM |
| C | ACB | DCS | IPX | MR | RGB SYSTEM |
| D | ABD | DCS | SPX | MR | RGB SYSTEM |
| E | ABE | DCS | IPX | MH | XYZ SYSTEM |
| | | DCS | SPX | MH | RGB SYSTEM |
| F | ABF | BIOS | IPX | MR | XYZ SYSTEM |

W1 / W2 / W3 / W4 / W5 / W6

LUT

DATA PROCESSOR AND DATA TRANSFER METHOD

BACKGROUND OF THE INVENTION

The present invention relates to transfer of data used in a system for transferring data among a plurality of information processing devices, and in particular to a data processor and a data transfer method, responsive to need of some conversion or data processing between recorded data and data needed at transfer destination, for conducting a series of processing from data readout to processing and transfer most efficiently.

In case data are transmitted from a certain terminal to another terminal, it is necessary to make the transmission management scheme of the transmission data description scheme (such as the head structure, coding scheme, and coding default condition) and the transmission data transmission scheme (such as protocol) coincide between the transmitting side and the receiving side.

Especially if transmitted data are images which are not coded such as text data, then the number of pixels of an image which can be displayed at the transmission destination and the number of colors which can be used are limited by display specifications of an apparatus of transmission destination. In case a plurality of apparatuses are connected via a network and stored image data are transferred to a different apparatus and displayed, therefore, specifications of the stored image data are different from specifications of the displaying apparatus. In order to absorb difference in specifications in some place in the system, it is necessary in this case to effect conversion on the image data itself. Such a problem exists for not only images (such as still pictures and moving pictures) but also data which are difficult to code such as speech.

In case image data or the like other than coded data were transmitted between different terminal apparatuses, therefore, conventionally a converter for matching the transmission management scheme was individually built in each terminal apparatus of the transmitting side and transmission data matched to the transmission management scheme of the terminal apparatus of the receiving side were generated by the terminal apparatus of the transmitting side and transmitted to the terminal apparatus of the receiving side. On the other hand, conversion relating to contents of image data depended upon specifications and purpose of use of the transmission destination and hence successive conversion was conducted at the transmission destination.

Herein, an apparatus storing and transmitting data is referred to as server, and an apparatus of the receiving side issuing a transmission request and receiving data is referred to as client. It is now assumed that not only such a system configuration that a plurality of servers and a plurality of clients are connected to a network but also such a system configuration that a server is associated with a client in a one-to-one correspondence is included.

Herein, conversion of transmission management scheme and data conversion are collectively referred to as conversion unless especially specified.

Recently, the environment of the client-server system (CSS), in which a plurality of clients and a plurality of servers are connected to a communication network and image data are transferred via the communication network, is now being arranged. In case a system is constructed by using a plurality of apparatuses having different performance and specifications and image data are transmitted, however, the above described conventional technique causes the following problems.

(1) In case the processing speed of a client is significantly lower than the processing speed of a server, processing time is sometimes wasted if complicated data processing is conducted on the client side;

(2) In case a server is accessed from a large number of clients simultaneously, response performance to all clients is degraded if conversion is carried out on the server side one by one;

(3) In case an image having a large number of pixels is transferred and displayed in an apparatus having a low resolution, the coefficient of utilization of the network is lowered if data conversion is carried out on the client side, because a large amount of data must be transferred via the network although they are not displayed;

(4) In case a part of processing is executed by hardware for achieving a higher speed, hardware is mounted on every client and expensive facility cost is needed if processing is conducted on the client side;

(5) In case clients individually cope with data conversion, an operator must grasp parameters concerning the conversion in effecting conversion processing; and (6) In case, for example, data are stored by using a scheme the client side cannot cope with, operators must individually cope with processing for which various schemes such as a coding scheme exist.

SUMMARY OF THE INVENTION

An object of the present invention is to provide a data processor and a data transfer method capable of reducing the facility cost, avoiding duplication of facility cost, and shortening the processing time in case data are transferred between terminal apparatuses having different transmission management schemes or between terminal apparatuses having different image display specifications.

In accordance with the present invention, a data processor (transmission intermediating apparatus) other than a server and a client is provided and the data processor is provided with means for effecting conversion processing required for data transfer. Furthermore, a data processor (transmission intermediating apparatus) may also be provided within a server or a client.

Judgment on contents of required conversion is made by storing beforehand transmission management information including identification information concerning a plurality of external apparatuses, discriminating the server of transmission source and the client of transmission destination by using the identification information, searching and recognizing transmission management information concerning those external apparatuses, making an analysis on the basis of transmission data and transmission management information, and converting the transmission data to transmission data conformed to the client.

Furthermore, in case the processing time of the above described conversion processing is to be made shortest, it is done by calculating, for each of apparatuses connected to the system and capable of executing the conversion processing, processing time needed for case of execution therein, calculating transfer time on the transmission line for each case, judging synthetically the processing time and transfer time at that time point, and determining a procedure for executing that conversion most rapidly.

Furthermore, in accordance with the present invention, a data transmission request from a certain client causes on the server side pertinent data to be read out from a data storage medium such as a magnetic disk and simultaneously causes attributes of pertinent data such as information concerning the number of pixels and the number of colors in case of images to be read out from the management table and so on. Furthermore, information concerning the client which has requested data is also read out from the management table and so on.

These two kinds of information clarify contents of conversion required for transmitting, to the pertinent client, data for which a transmission request has been made, such as whether the resolution conversion processing for changing the number of pixels is required and its magnification. Respective parameters can thus be calculated.

When the contents of conversion which should be executed have been found, processing time values needed for executing each processing in the server and the client are calculated. At this time, the necessary time of the server side changes momentarily depending upon the number of connected clients, and hence calculation inclusive of the occupation factor of the computing element is conducted. Furthermore, the transfer speed of the network at each time point is also calculated in the same way.

When the above described respective pieces of information are all present, a procedure for completing the pertinent processing and data transfer synthetically in the shortest processing time is determined in the server. At this time, it is necessary to consider that not only the processing time should be short but also the transfer time differs depending upon the quantity of transfer of data moved in the network.

The same may be said of conversion of the transmission management method. Transmission management information pieces concerning the server and client are held in the lump. If data are to be transmitted between apparatuses having different transmission management schemes, then transmission management information of those apparatuses is searched and transmission data inputted from the server side are analyzed on the basis of the transmission management information searched as described above and are converted into transmission data conformed to the external apparatus of the client side.

As a result, the operator can execute data transmission with an efficiency high with respect to the system even if the operator does not grasp information concerning each client and the situation of the network.

Furthermore, even in case hardware dedicated to a part of processing is employed for achieving a higher speed of data processing, the processing time can be shortened with addition of a small number of components by exercising management using the above described method so that the hardware may be accessed by each client as a third apparatus connected to a line.

BRIEF DESCRIPTION OF THE DRAWINGS

FIG. 2 is a configuration diagram of a transmission management information table;

DESCRIPTION OF THE PREFERRED EMBODIMENTS

The present invention will hereafter be described in more detail by referring to illustrated embodiments. The present invention is not limited by them.

Figure 1:
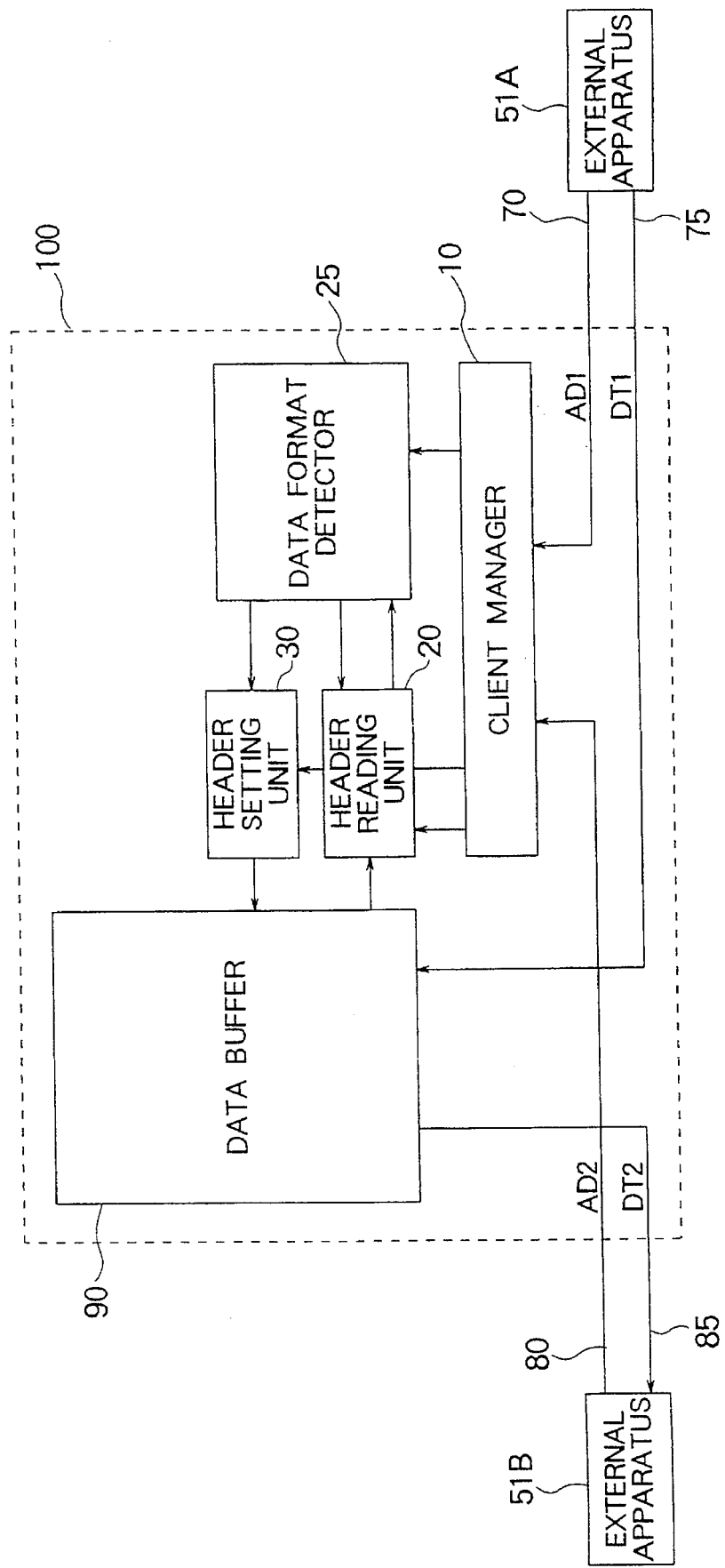
FIG. 1 is an internal block diagram of a data processor according to a first embodiment of the present invention.

FIG. 1 is an internal block diagram of a data processor 100 according to a first embodiment of the present invention. For brevity, only the inside of a block concerning data conversion will be first taken out and described. Therefore, the data processor 100 will now be described as intermediating between the server and client. Instead, the same means may be provided in the server and client.

In this FIG. 1, the data processor 100 acts as an intermediary for image data supplied from an external apparatus 51A of transmitting side to an external apparatus 51B of receiving side.

This data processor 100 is connected to the external apparatus 51A of transmitting side via an address line 70 for transmitting an address AD1 of the external apparatus 51A of transmitting side and a communication cable 75 for transmitting transmission data DT1 fed from the external apparatus 51A of transmitting side.

Furthermore, this data processor 100 is connected to the external apparatus 51B of receiving side via an address line 80 for transmitting an address AD2 of the external apparatus 51B of receiving side and a communication cable 85 for transmitting transmission data DT2 to be fed to the external apparatus 51B of receiving side.

This data processor 100 includes a data buffer 90, a client manager 10, a header reading unit 20, a data format detector 25, and a header setting unit 30.

The data buffer 90 temporarily holds transmission data fed from the external apparatus 51A of transmitting side.

By referring to an internal transmission management information table LUT, the client manager 10 outputs control parameters to the header reading unit 20, the data format detector 25, and the header setting unit 30.

The header reading unit 20 reads only a header from transmission data held in the data buffer 90 and outputs it to the data format detector 25.

The header setting unit 30 sets a new header by interchanging a component of a header or changing the description form of a component.

FIG. 2 is a configuration diagram of the transmission management information table LUT included in the client manager 10.

In an identifier column W1, identifiers of the external apparatus 51A and so on are stored. For example, "A" is stored for the external apparatus 51A, and "B" is stored for the external apparatus 51B. In an address column W2, addresses of the external apparatus 51A and so on are stored. For example, "ABC" is stored for the identifier "A" and "ACD" is stored for the identifier "B."

In a protocol column W3, protocols of the external apparatus 51A and so on are stored. For example, "DCS" is stored for the identifiers "A" and "B." For an identifier "F" (external apparatus 51F), both the "DCS" and "BIOS" can be coped with and hence both protocols can be stored.

In an identifier column W4, data structures inputted and outputted by the external apparatus 51A and so on are stored. By this data structure, components of the header and a coupling structure between the header and actual data are specified. For example, "IPX" is stored for the identifier "A" and "SPX" is stored for the identifier "F." For the identifier "F" (external apparatus 51F), "SPX" and "IPX" can be stored respectively in association with protocols.

In a coding scheme column W5, coding schemes of actual data inputted and outputted by the external apparatuses 51A and so on are stored. For example, "MH" (Modified Huffman) is stored for the identifiers "A" and "B". For the identifier "F", "MH" and "MR" (Modified Read) can be stored respectively in association with protocols.

In a coding default condition column W6, the default condition of the coding scheme of the coding scheme column W5 is stored. For example, in JPEG (Joint Photographic Experts Group), the color space is decided to be the default condition of coding and hence the color space is decided to be default condition. For example, for coding schemes "MH" of the identifiers "A" and "B", "RGB system" is stored. For the identifier "F", "RGB system" and "XYZ system" are stored in association with coding schemes.

Figure 3:
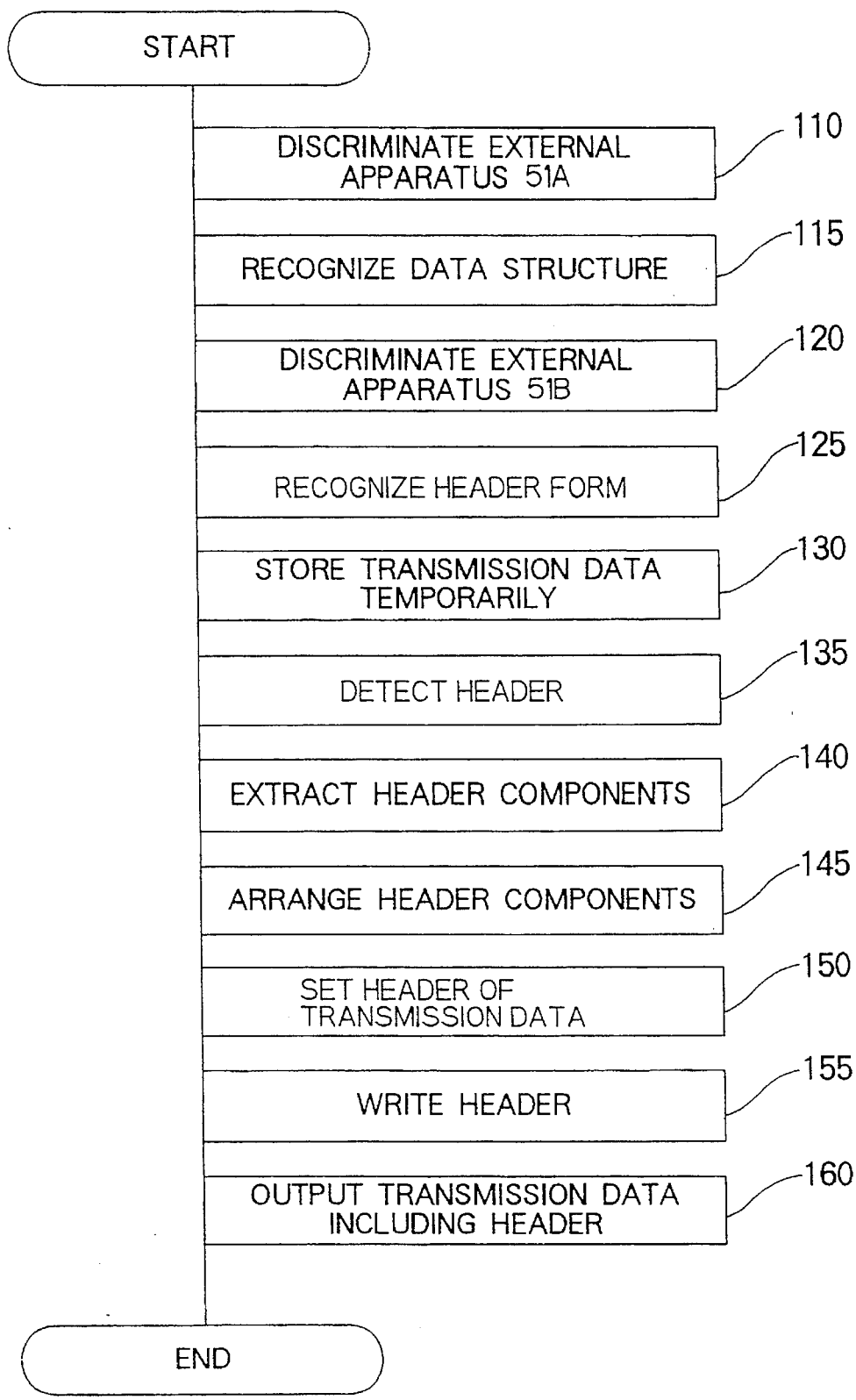
FIG. 3 is an operation flow diagram of the data processor shown in FIG. 1.

FIG. 3 is an operation flow diagram of this data processor 100.

First of all, at step 110, address ADI of the external apparatus 51A of transmitting side is received via the address line 70. Thereby, the client manager 10 judges the address AD1 to be the address "ABC" and discriminates the identifier "A" of the external apparatus 51A.

At step 115, the client manager 10 recognizes the data structure "IPX" of the transmission data DT1 supplied from the external apparatus 51A on the basis of the transmission management information table LUT and sends control parameters to the data format detector 25.

At step 120, the address AD2 of the external apparatus of receiving side is received via the address line 80. Thereby, the client manager 10 judges the address AD2 to be the address "ACD" and discriminates the identifier "B" of the external apparatus 51B.

At step 125, the client manager 10 recognizes that transmission data of the external apparatus 51A of transmitting side differ from transmission data of the external apparatus 51B of receiving side in only the "data structure column W4" on the basis of the transmission management information table LUT. Then the client manager indicates the header form of the transmission data DT2, which should be outputted to the external apparatus 51B of receiving side, to the header setting unit 30.

At step 130, the transmission data DT1 supplied from the external apparatus 51A of transmitting side is written into the data buffer 90.

Figure 4:
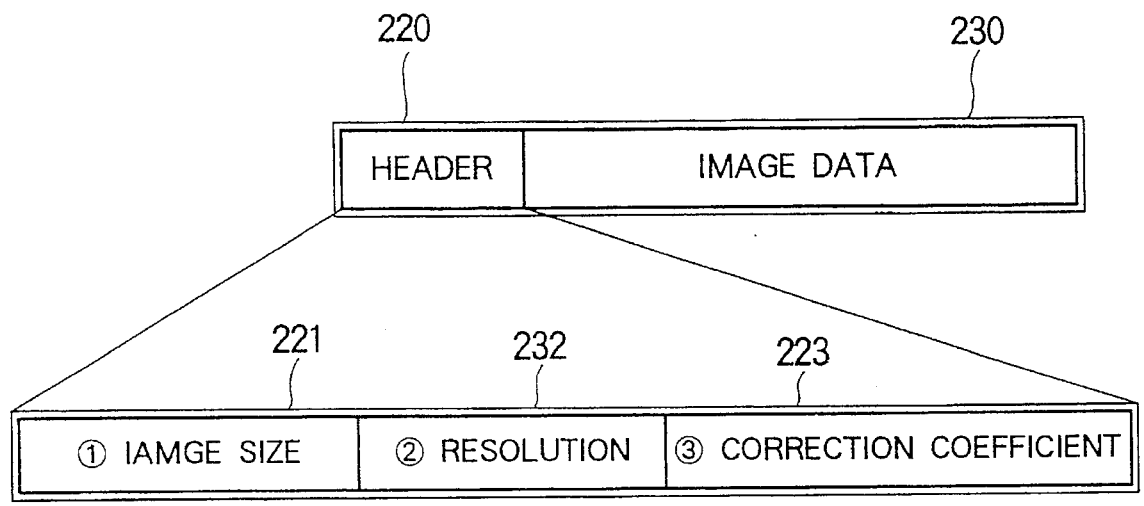
FIG. 4 is a data structure diagram of an external apparatus of transmission side.

FIG. 4 illustrates the data structure ("IPX") of the transmission data DT1. The transmission data DT1 includes a header 220 and image data 230 functioning as actual data.

In the header 220, components are located in the order of ① image size column 221, ② resolution column 222, and ③ correction coefficient column 223 as shown in the lower part of FIG. 4.

In ① image size column 221, the number of pixels of the image (vertical and horizontal) is indicated by two bytes, for example.

In ② resolution column 222, the resolution of the image is indicated by an integer of four bytes, for example.

In ③ correction coefficient column 223, the correction coefficient (such as a $\gamma$ coefficient) peculiar to the image is indicated by floating-point representation of four bytes, for example.

The header 220 sometimes includes a parameter indicating the default condition of coding.

Referring back to FIG. 3, the header reading unit 20 reads out only the header from the transmission data DT1 written into the data buffer 90 and sends the header to the data format detector 25.

At steps 140 and 145, the data format detector 25 extracts/arranges components (image size column 221, resolution column 222, and correction coefficient column 223) from the header and sends them to the header setting unit 30.

At step 150, the header setting unit 30 produces a header 260 of the transmission data DT2 on the basis of the header form received at the step 125.

Figure 5:
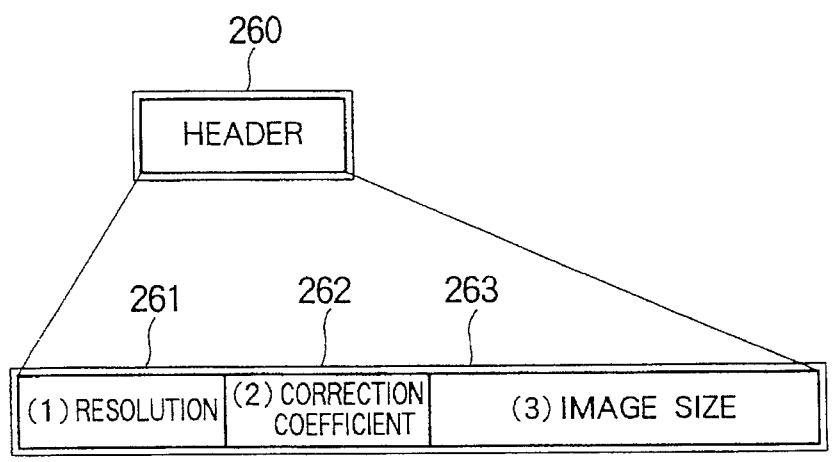
FIG. 5 is a data structure diagram of an external apparatus of receiving side.

FIG. 5 shows the data structure ("SPX") of the transmission data DT2. In the header 260 of the transmission data DT2, components are located in the order of (1) resolution column 261, (2) correction coefficient column 262, and (3) image size column 263.

In (1) resolution column 261, a result obtained by transforming the resolution column 222 of the transmission data DT1 (② of the lower part of FIG. 4) into a two-byte integer is indicated.

In (2) correction coefficient column 262, a result obtained by transforming the correction coefficient column 262 of the transmission data DT1 (③ of the lower part of FIG. 4) into fixed point representation using two bytes is indicated.

The (3) image size column 263 is the same as the image size 221 of the transmission data DT1 (① in the lower part of FIG. 4).

Referring back to FIG. 3, at step 155, the produced header 260 is written into the data buffer 90 and united with the image data 230 shown in FIG. 4 to form the transmission data DT2.

At step 160, the transmission data DT2 formed in the data buffer 90 is outputted to the external apparatus 51B of receiving side via the communication cable 85.

According to the above described first embodiment, header forms of apparatuses of transmitting side and receiving side are managed collectively by the client manager. At the time of communication, the header forms of transmitting side and receiving side are matched with each other. Therefore, it is not necessary to adjust header forms in the external apparatuses of transmitting side and receiving side.

Figure 6:
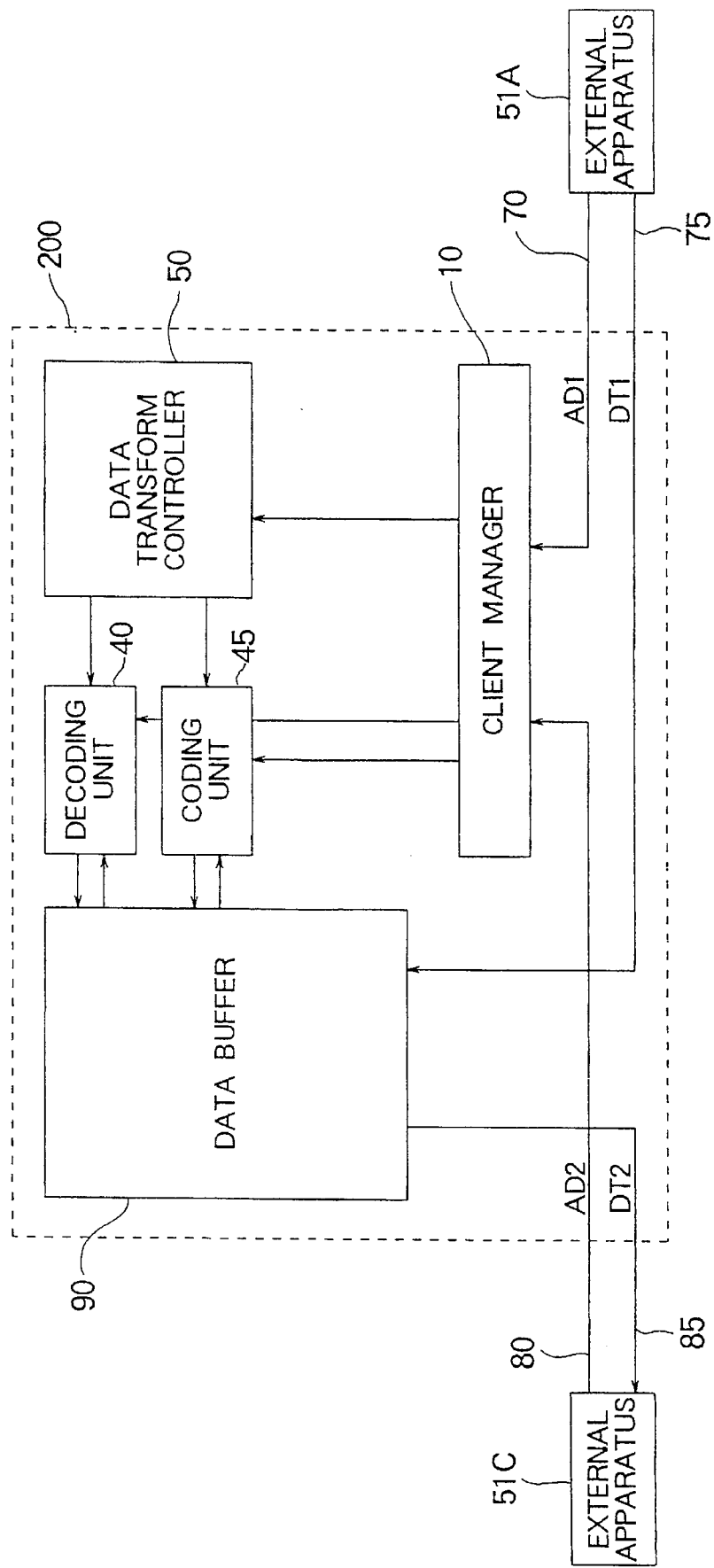
FIG. 6 is an internal block diagram of a data processor according to a second embodiment of the present invention.

FIG. 6 is an internal block diagram of a data processor 200 according to a second embodiment of the present invention. This data processor 200 in the second embodiment acts as an intermediary for transmission of image data from the external apparatus 51A of transmitting side to an external apparatus 51C of receiving side.

This data processor 200 has nearly the same configuration as that of the data processor 100 according to the first embodiment. However, the data processor 200 includes a decoding unit 40, a coder unit 45, and a data transform controller 30 instead of the header reading unit 20, the data format detector 25, and the header setting unit 30.

The decoding unit 40 decodes coded image data to an intermediate form and writes resultant data into the data buffer 90.

The coder unit 45 codes image data of the intermediate form according to a coding scheme depending upon the receiving side and writes resultant data into the data buffer 90.

On the basis of control parameters supplied from the client manager 10, the data transform controller 50 makes the decoding unit 40 decode image data and makes the coder unit 45 code image data.

Figure 7:
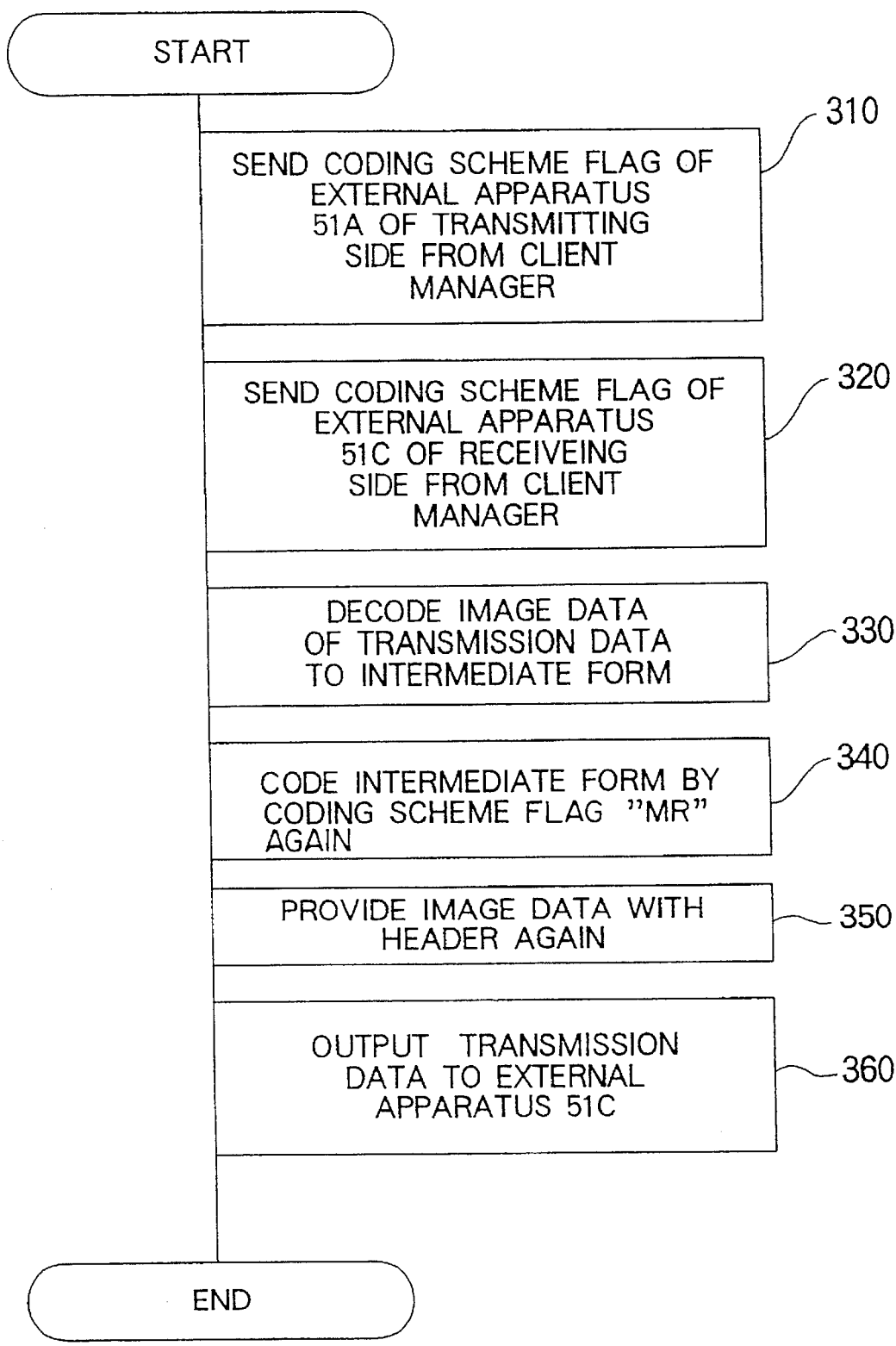
FIG. 7 is an operation flow diagram of the data processor shown in FIG. 6.

FIG. 7 is an operation flow diagram of this data processor 200. It is now assumed that the identifier "A" of the external apparatus 51A of transmitting side and an identifier "C" of the external apparatus 51C of receiving side have been already obtained by referring to the transmission management information table LUT included in the client manager 10 in the same way as the first embodiment.

At step 310, the coding scheme "MH" is recognized on the basis of the identifier "A" of the external apparatus 51A of transmitting side. Thereby, the client manager 10 sends control parameters required to decode image data to intermediate form data, to the data transform controller 50.

At step 320, the coding scheme "MR" is recognized on the basis of the identifier "C" of the external apparatus 51C of receiving side. Thereby, the client manager 10 sends control parameters required to code intermediate form data by means of the coding scheme "MR" to the data transform controller 50

At step 330, the decoding unit 40 takes out only image data from the transmission data DT1 written into the data buffer 90, decodes the image data to the intermediate form, and writes resultant data into the data buffer 90 again. Intermediate form data are obtained by transforming brightness of each pixel (R, G, B) of color image into a binary value.

The decoding scheme of the external apparatus 51A of transmitting side is "MH." Therefore, the image data is decoded to intermediate form data by separating the image data into an M code (make up code) and a T code (terminating code) and calculating the corresponding run length. In such a case, a definition formula of the MH coding scheme disclosed, for example, in "Image information compression" supervised by Hiroshi Harajima and published by OHM SHA LTD. can be used.

At step 340, the coder unit 45 reads out intermediate form data from the data buffer 90, codes the intermediate form data by means of the coding scheme "MR" again, and produces image data.

To be concrete, position relation between an observed change pixel (pixel where "bright" changes to "dark" or "dark" changes to "bright") and a reference change pixel is classified into pass mode, vertical mode, or horizontal mode. Distance between the observed change pixel and the reference change pixel is coded. Such coding is disclosed, for example, in "Image information compression" supervised by Hiroshi Harajima and published by OHM SHA LTD.

At step 350, the produced image data is written back into the data buffer 90, and provided with a header again to generate transmission data DT2.

At step 360, the generated transmission data DT2 is outputted to the external apparatus 51C of receiving side.

According to the above described second embodiment, coding schemes of apparatuses of transmitting side and receiving side are managed collectively by the client manager and at the time of communication, coding schemes of transmitting side and receiving side are matched with each other. Therefore, it is not necessary to adjust coding schemes in the apparatuses of transmitting side and receiving side.

Figure 8:
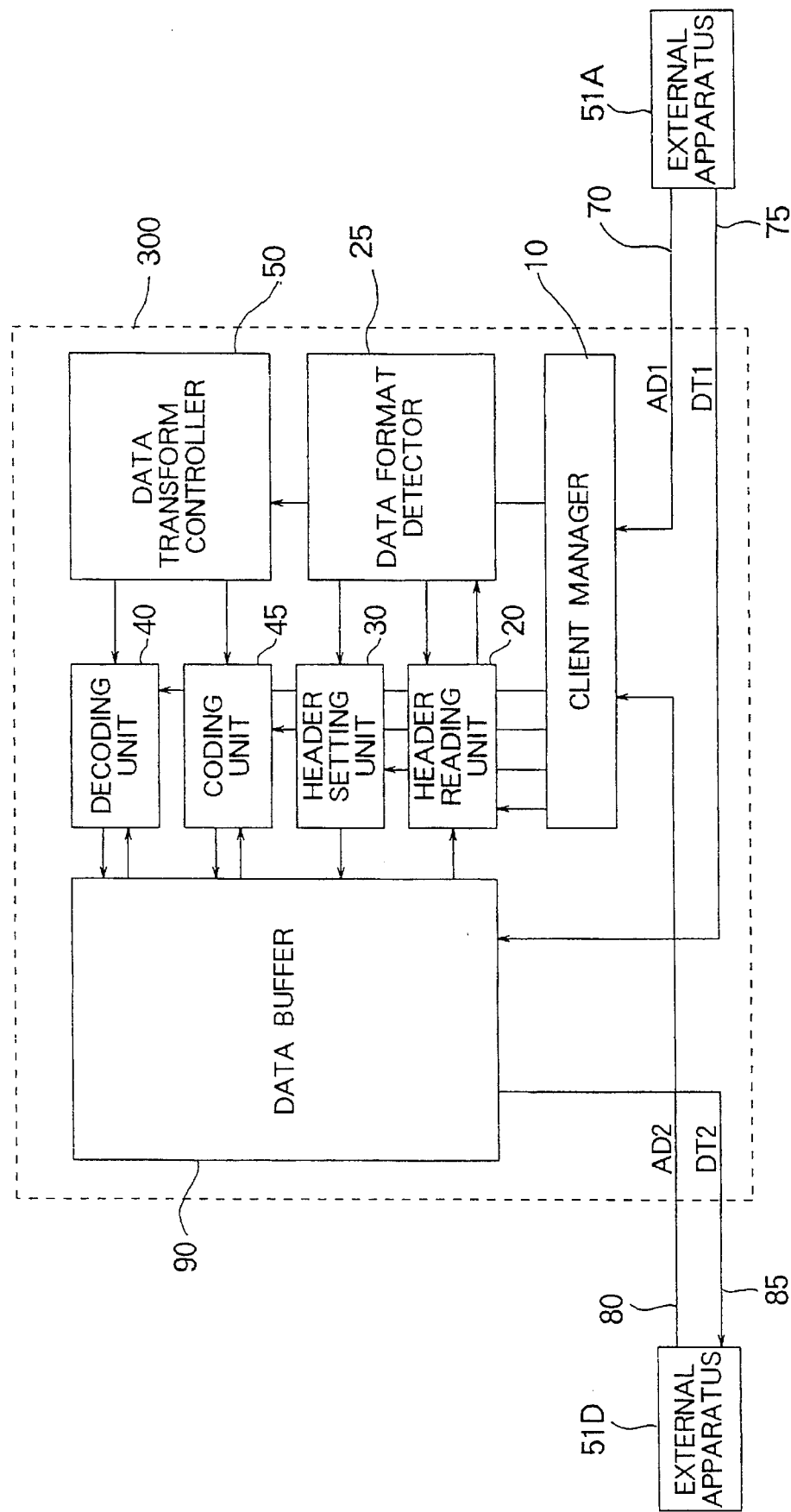
FIG. 8 is an internal block diagram of a data processor according to a third embodiment of the present invention.

FIG. 8 is an internal block diagram of a data processor 300 according to a third embodiment of the present invention. In the third embodiment, the data processor 300 acts as an intermediary for transmission of image data from the external apparatus 51A of transmitting side to an external apparatus 51D of receiving side.

This data processor 300 has a configuration including components of both the data processor 100 of the first embodiment and the data processor 200 of the second embodiment.

Figure 9:
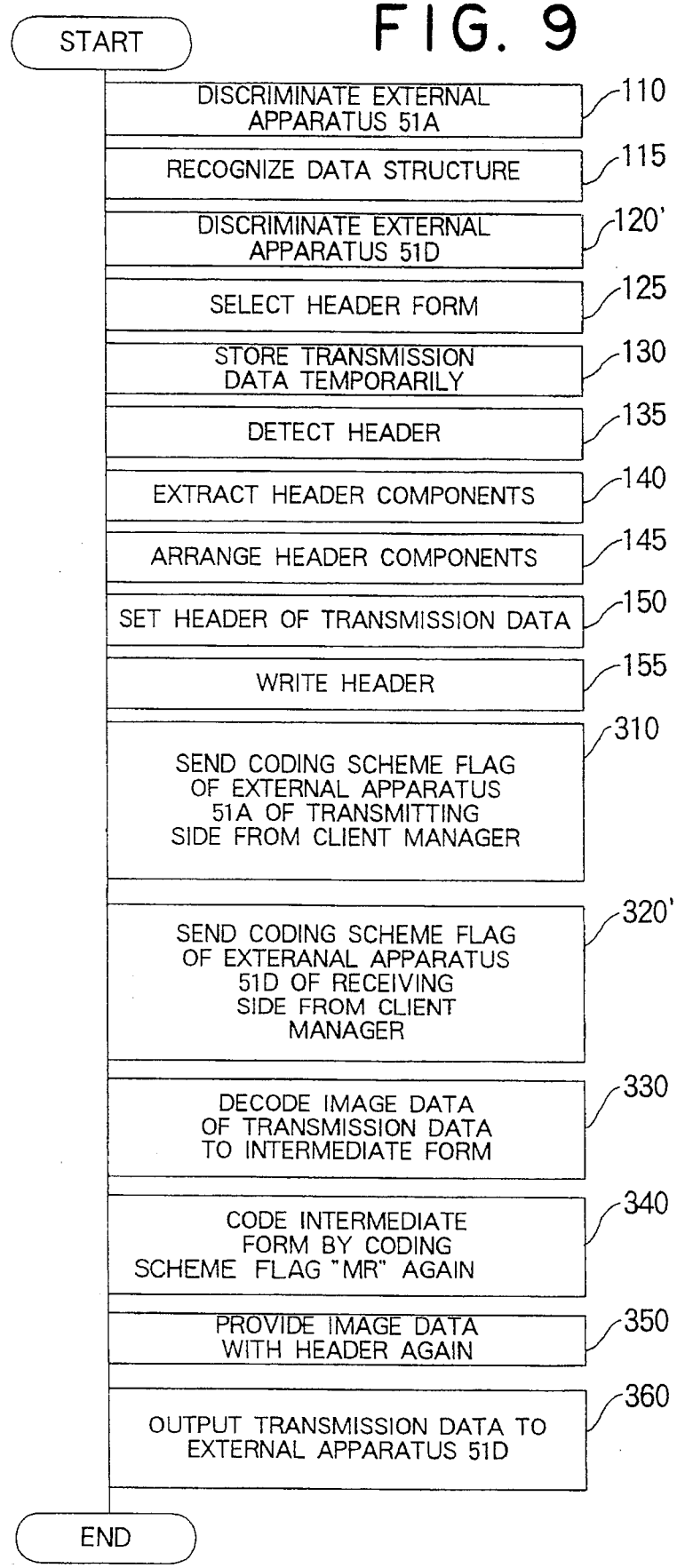
FIG. 9 is an operation flow diagram of the data processor shown in FIG. 8.

FIG. 9 is an operation flow diagram of this data processor 300.

Steps 110 and 115 shown in FIG. 9 are the same processing as that of the steps 110 and 115 shown in FIG. 3.

Step 120' shown in FIG. 9 is nearly the same processing as the step 120 shown in FIG. 3. However, the client manager 10 discriminates an identifier "D" of the external apparatus 51D.

Steps 130 through 155 shown in FIG. 9 are the same processing as that of the steps 130 through 155 shown in FIG. 3.

Step 310 shown in FIG. 9 is the same processing as that of the step 310 shown in FIG. 7.

Step 320' shown in FIG. 9 is nearly the same processing as that of the step 320 shown in FIG. 7. However, the coding scheme "MR" is recognized on the basis of the identifier "D" of the external apparatus 51D of receiving side.

Steps 330 through 360 shown in FIG. 9 is the same processing as that of the steps 330 through 360 shown in FIG. 7.

According to the above described third embodiment, header forms and coding schemes of apparatuses of transmitting side and receiving side are managed collectively by the client manager. At the time of communication, the header forms and coding schemes of transmitting side and receiving side are matched with each other. Therefore, it is not necessary to adjust header forms and coding schemes in the external apparatuses of transmitting side and receiving side.

Figure 10:
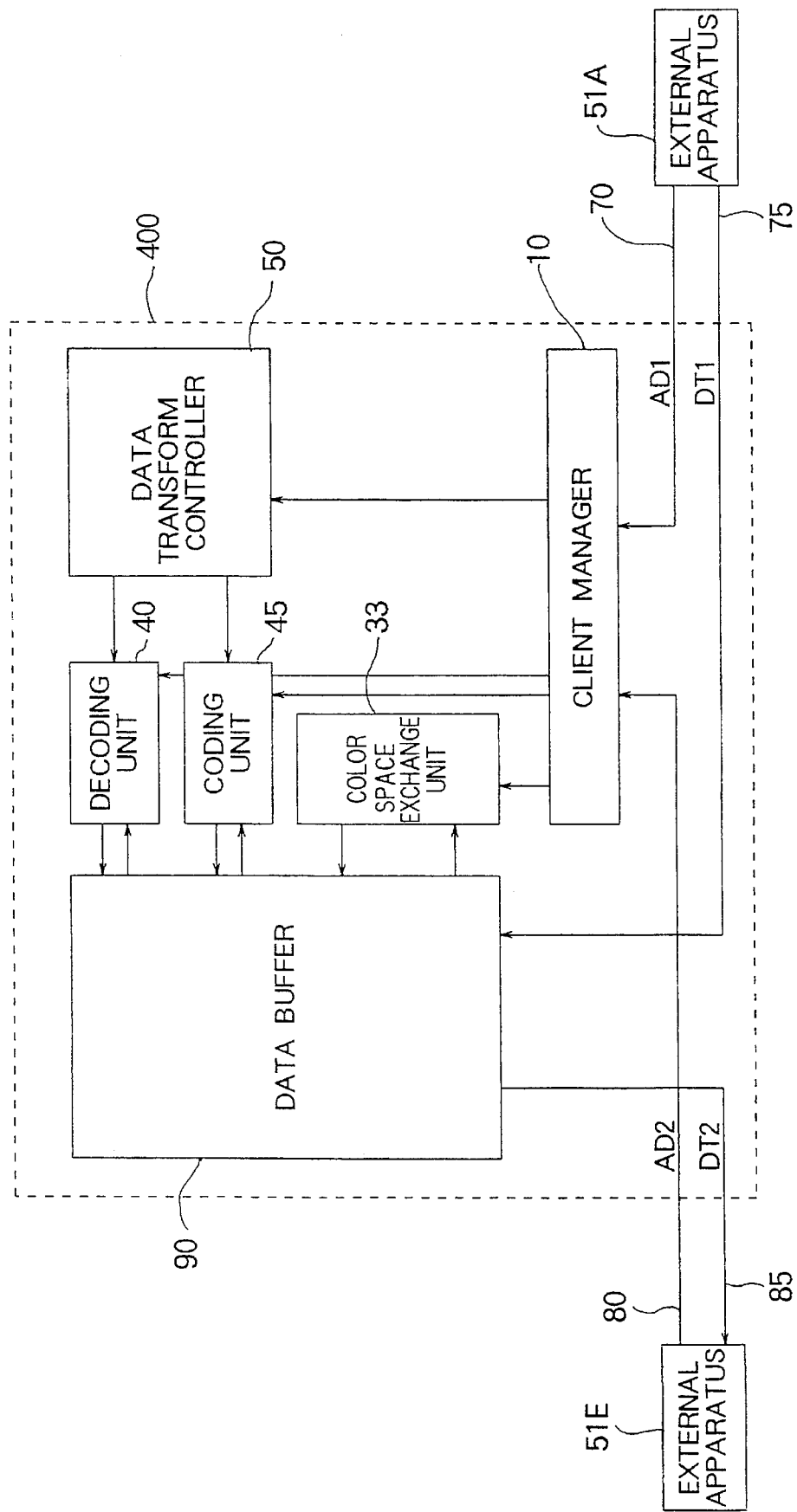
FIG. 10 is an internal block diagram of a data processor according to a fourth embodiment of the present invention.

FIG. 10 is an internal block diagram of a data processor 400 according to a fourth embodiment of the present invention. In the fourth embodiment, the data processor 400 acts as an intermediary for transmission of image data from the external apparatus 51A of transmitting side to an external apparatus 51E of receiving side.

This data processor 400 has nearly the same configuration as that of the data processor 200 according to the second embodiment. However, the data processor 400 has a color space exchange unit 33 in addition to the configuration of the data processor 200.

Figure 11:
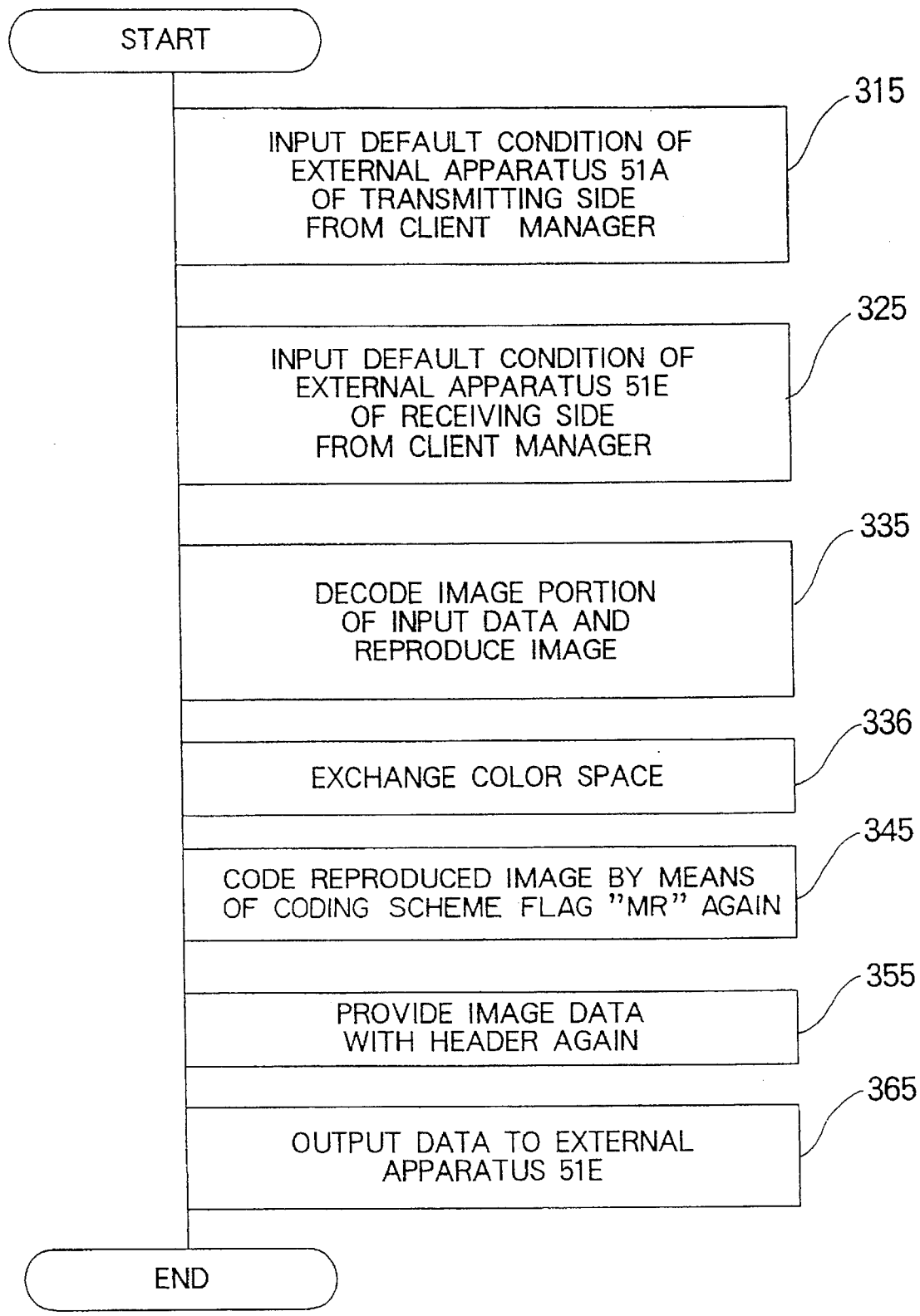
FIG. 11 is an operation flow diagram of the data processor shown in FIG. 10.

FIG. 11 is an operation flow diagram of this data processor 400.

At step 315, the client manager 10 reads out the default condition "RGB system" of the coding scheme "MH" of the external apparatus 51A of transmitting side and sends it to the decoding unit 40.

At step 325, the client manager 10 discriminates an identifier "E" of the external apparatus 51E of receiving side and recognizes that difference between the external apparatus 51A of transmitting side and the external apparatus 51E of receiving side is "default condition W5 of coding" by referring to the transmission management information table LUT. Then the client manager 10 reads out the default condition "XYZ system" of coding of the external apparatus 51E from the transmission management table LUT and sends it to the data format controller 50 for control parameters.

At step 335, the decoding unit 40 takes out only image data from the transmission data DT1 written into the data buffer 90, decodes it to intermediate form data, and writes the intermediate form data into the data buffer 90 again.

At step 336, the color space exchange unit 33 reads out the intermediate form data from the data buffer 90, changes the color space to "XYZ system" and writes the result into the data buffer 90 again.

To be concrete, tristimulus values (X, Y, Z) for pixel (R, G, B) of intermediate form (color space "RGB system") are represented by the following equations according to CIE (Commission Internationale de l'Echairage).

$$X=2.7689R+1.7517G+1.1302B$$

$$Y=1.0000R+4.5907G+0.0601B$$

$$Z=0.0565G+5.5943B$$

Such a color space exchange method is disclosed in, for example, "Electrical Engineering Pocket Book" edited by The Institute of Electrical Engineers of Japan and published by OHM SHA LTD.

At step 345, the coder unit 45 reads intermediate form data (color space "XYZ system") from the data buffer 90, codes it by means of the coding scheme "MH" of the external apparatus 51E of receiving side again, and produces image data.

At step 355, the reproduced image data is written back into the data buffer 90 and provided with a header again to generate the transmission data DT2.

At step 365, the generated transmission data DT2 is outputted to the external apparatus 51E of receiving side.

In the above described fourth embodiment, it has been assumed that the external apparatuses differ only in the default condition of coding. However, in case coding scheme also differs in addition to the default condition of coding, conducting the above described processing in addition to the processing according to the second embodiment suffices. Furthermore, in case the header form differs, processing according to the first embodiment (third embodiment) may be added.

According to the above described fourth embodiment, default conditions of coding (such as "color space") of apparatuses of transmitting side and receiving side are managed collectively by the client manager. At the time of communication, the default conditions of coding of transmitting side and receiving side are matched with each other. Therefore, it is not necessary to adjust the default conditions of coding in the external apparatuses of transmitting side and receiving side.

In the above described first through fourth embodiments, the data processor 100, . . . , 400 is connected to the external apparatus 51A of transmitting side via the address line 70 and the communication cable 75, and the data processor 100, . . . , 400 is connected to the external apparatus 51B, . . . , 51E of receiving side via the address line 80 and the communication cable 85. Alternatively, however, all lines may be collected into a single transmission line by adding an address detector.

Figure 12:
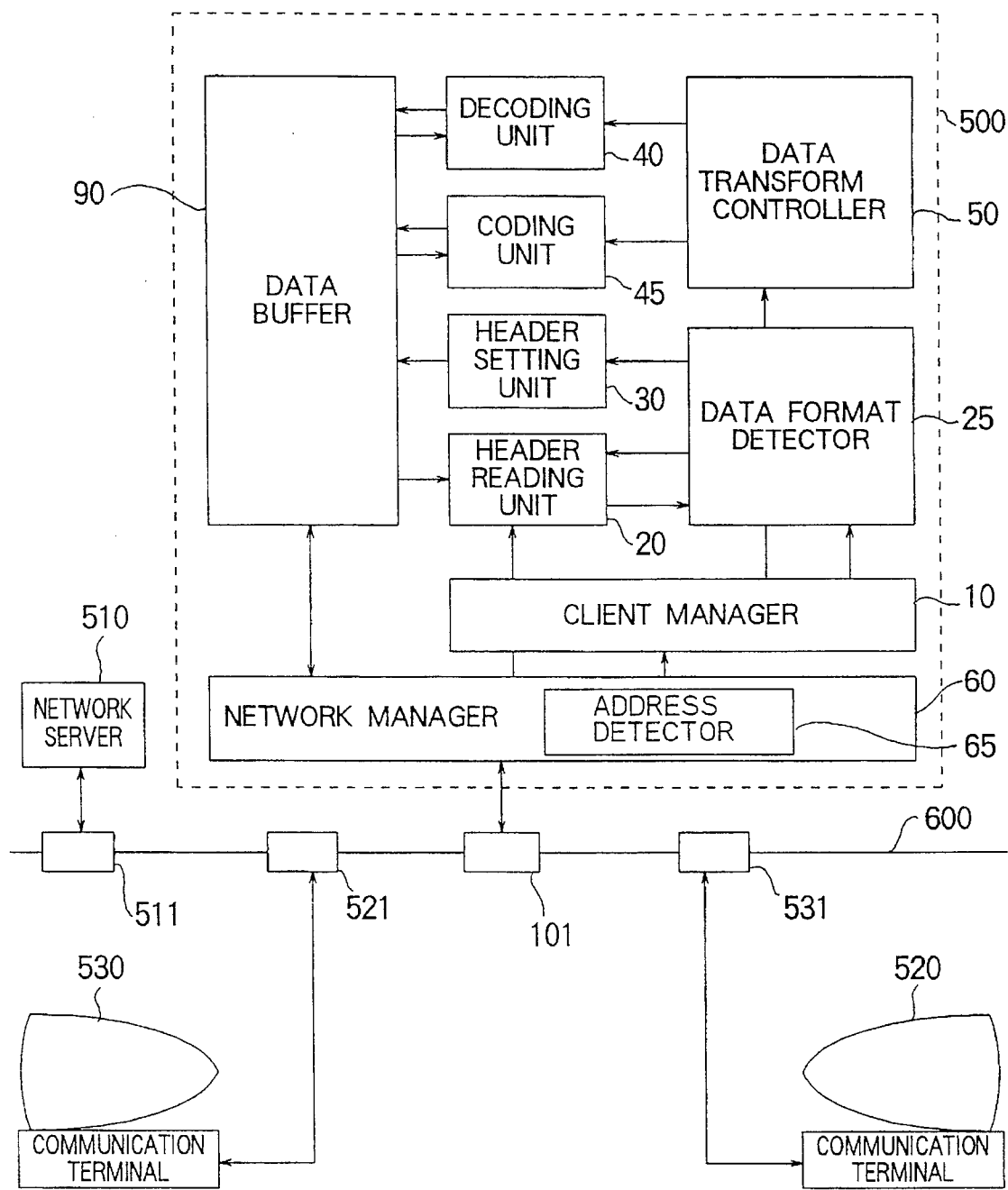
FIG. 12 is a diagram showing a primary part extracted from a communication network including the data processor according to a fifth embodiment of the present invention.

FIG. 12 is a diagram showing a principal part extracted from a communication network including a data processor 500, which is a fifth embodiment of the present invention. In the fifth embodiment, the data processor 500 acts as an intermediary for transmission of image data from a communication terminal 520 of transmitting side to a communication terminal 530 of receiving side.

This data processor 500 has nearly the same configuration as that of the data processor 300 according to the third embodiment. Since communication is held by using a network line 600, however, the data processor 500 has a network manager 60 in addition to the data processor 300. The network manager 60 has therein an address detector 65 for detecting an address from transmission data.

The data processor 500, a network server 510 for managing the network line, a communication terminal 520, and a communication terminal 530 are connected to the network line 600 via gateways 101, 511, 521, and 531, respectively.

Figure 13:
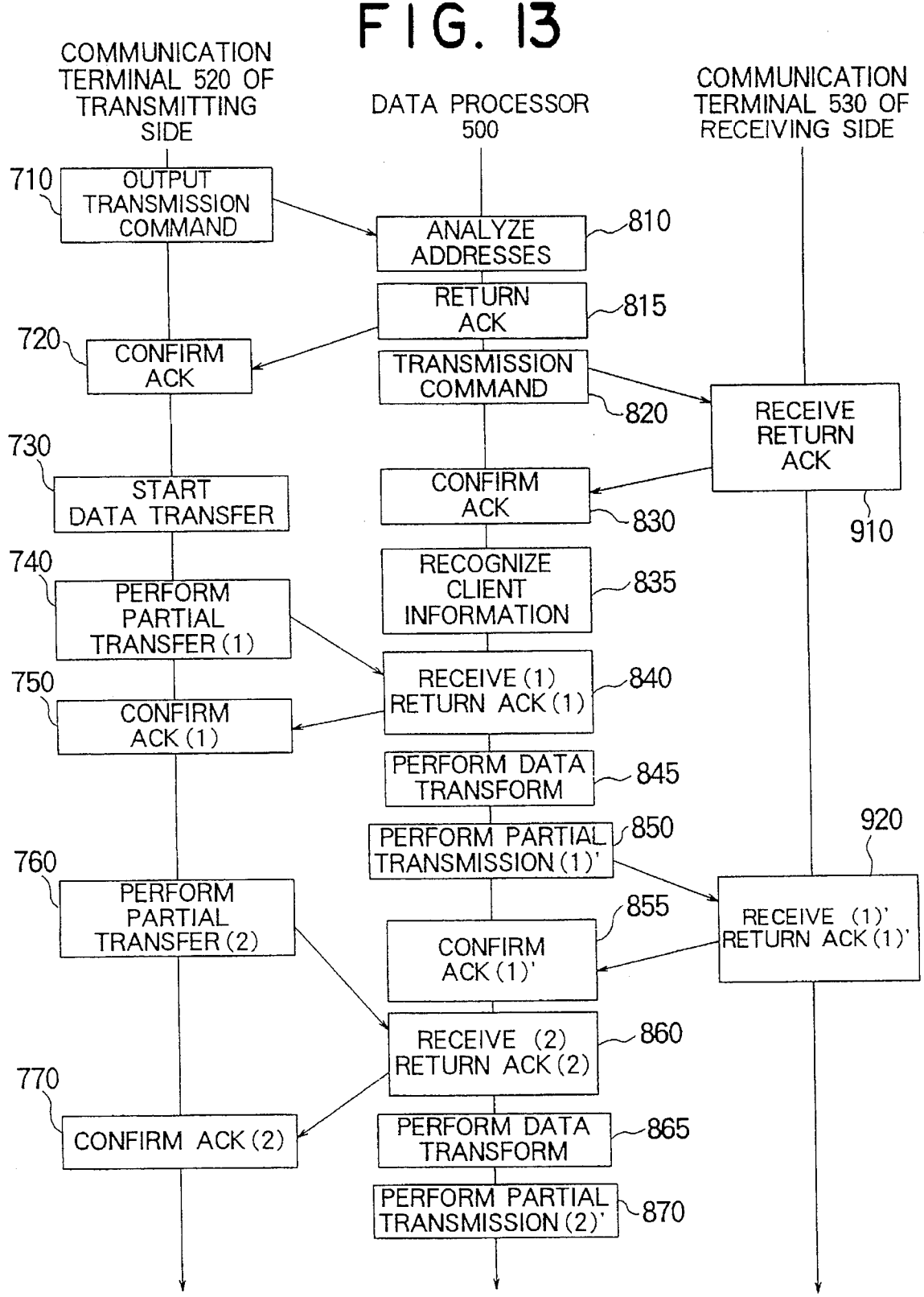
FIG. 13 is a communication sequence diagram of the data processor shown in FIG. 12.

FIG. 13 is a communication sequence diagram in the communication network.

In a sequence 710, the communication terminal 520 of transmitting side outputs a transmission command to the data processor 500 in order to request the communication terminal 530 of receiving side to transmit transmission data.

In a sequence 810, the address detector 65 of the data processor 500 analyzes the address of the communication terminal 520 of transmitting side and the address of the communication terminal 530 of receiving side on the basis of the transmission command.

In a sequence 815, the data processor 500 returns acknowledge ACK to the communication terminal 520 of transmitting side.

In a sequence 820, the data processor 500 outputs, to the communication terminal 530 of receiving side, the transmission command supplied from the communication terminal 520 of transmitting side. The order of the sequences 815 and 820 may be reversed.

In a sequence 720, the acknowledge ACK supplied from the data processor 500 is confirmed.

In a sequence 910, the communication terminal 530 of receiving side returns acknowledge ACK to the data processor 500.

In a sequence 830, the data processor 500 confirms the acknowledge ACK returned from the communication terminal 530 of receiving side.

In a sequence 835, the client manager 10 reads out transmission management information (such as protocol, data structure, coding scheme, and default condition of coding) in which the terminal 520 of transmitting side and the terminal 530 of receiving side are different from each other. The client manager 10 outputs the transmission management information to respective parts as control parameters.

In a sequence 730, the communication terminal 520 of transmitting side prepares for start of transmission data outputting.

In a sequence 740, the communication terminal 520 of transmitting side outputs first transmission data to the data processor 500 and performs partial transfer (1).

In a sequence 840, the data processor 500 accepts the partial transfer (1) by receiving (1) and returns acknowledge ACK (1) to the communication terminal 520 of transmitting side.

In a sequence 750, the communication terminal 520 of transmitting side confirms the acknowledge ACK (1).

In a sequence 845, the partial transfer (1) is transformed to intermediate form data and thereafter coding is performed and the data is provided with a header again to generate transmission data, by processing similar to the above described first through fourth embodiments.

In a sequence 850, the data processor 500 outputs the transmission data to the communication terminal 530 of receiving side and performs partial transmission (1)'.

In a sequence 920, the communication terminal 530 of receiving side accepts the partial transfer (1)' by receiving (1) and returns acknowledge ACK (1) to the data processor 500.

In a sequence 855, the data processor 500 confirms the acknowledge ACK (1)' returned from the communication terminal 530 of receiving side.

In a sequence 760, the communication terminal 520 of transmitting side outputs the next transmission data to the data processor 500 and performs partial transfer (2).

In a sequence 860, the data processor 500 accepts the partial transfer (2) and returns acknowledge ACK (2) to the communication terminal 520 of transmitting side.

In a sequence 770, the acknowledge ACK (2) is confirmed.

In a sequence 865, the partial transfer (2) is converted to intermediate form data and thereafter coding is performed and the data is provided with a header again to generate transmission data, by processing similar to the sequence 845.

In a sequence 870, the data processor 500 outputs the transmission data to the communication terminal 530 of receiving side and performs partial transfer (2)'.

Thereafter, the above described processing in the sequences 740, . . . 870 is repeated for all transmission data.

In the above described fifth embodiment, the data processor 500 is separated from the network server 510. Alternatively, the data processor 500 and the network server 510 may be included in the same apparatus.

Furthermore, default conditions of coding of the communication terminals of transmitting side and receiving side may be matched with each other by adding the color space exchange unit 33 to the above described fifth embodiment.

According to the above described fifth embodiment, effects similar to those of the above described first through fourth embodiments can be obtained in the communication network as well.

Furthermore, the following configuration may be adopted as other embodiments.

① In the above described first through fifth embodiments, the data buffer 90 for temporarily holding an image is separated from means for processing transmission data (such as the client manager 10, the header reading unit 20, and the header setting unit 30). Alternatively, the data buffer may be provided with function of processing the transmission data.

② The data processor according to the first through fifth embodiments may be formed by using software. For example, by incorporating software for calculating processing results of respective parts into a personal computer or a work station, effects similar to those of the above described first through fifth embodiments can be obtained.

Another embodiment obtained by incorporating the present invention in a server/client type system w111 now be described. In embodiments described below, the intermediating apparatus (data processor) for performing data conversion as described in the first through fifth embodiments is not provided individually, but it is included in the client. In a system including a plurality of servers and a plurality of clients, the scheme using the intermediating apparatus as described in the first through fifth embodiments is especially effective to the case where only one set of expensive special purpose hardware is mounted to conduct decoding processing, for example.

In case processing means are mounted in a plurality of places, embodiments described below aims at distributing the load so that the most efficient allotment may be obtained.

Figure 14:
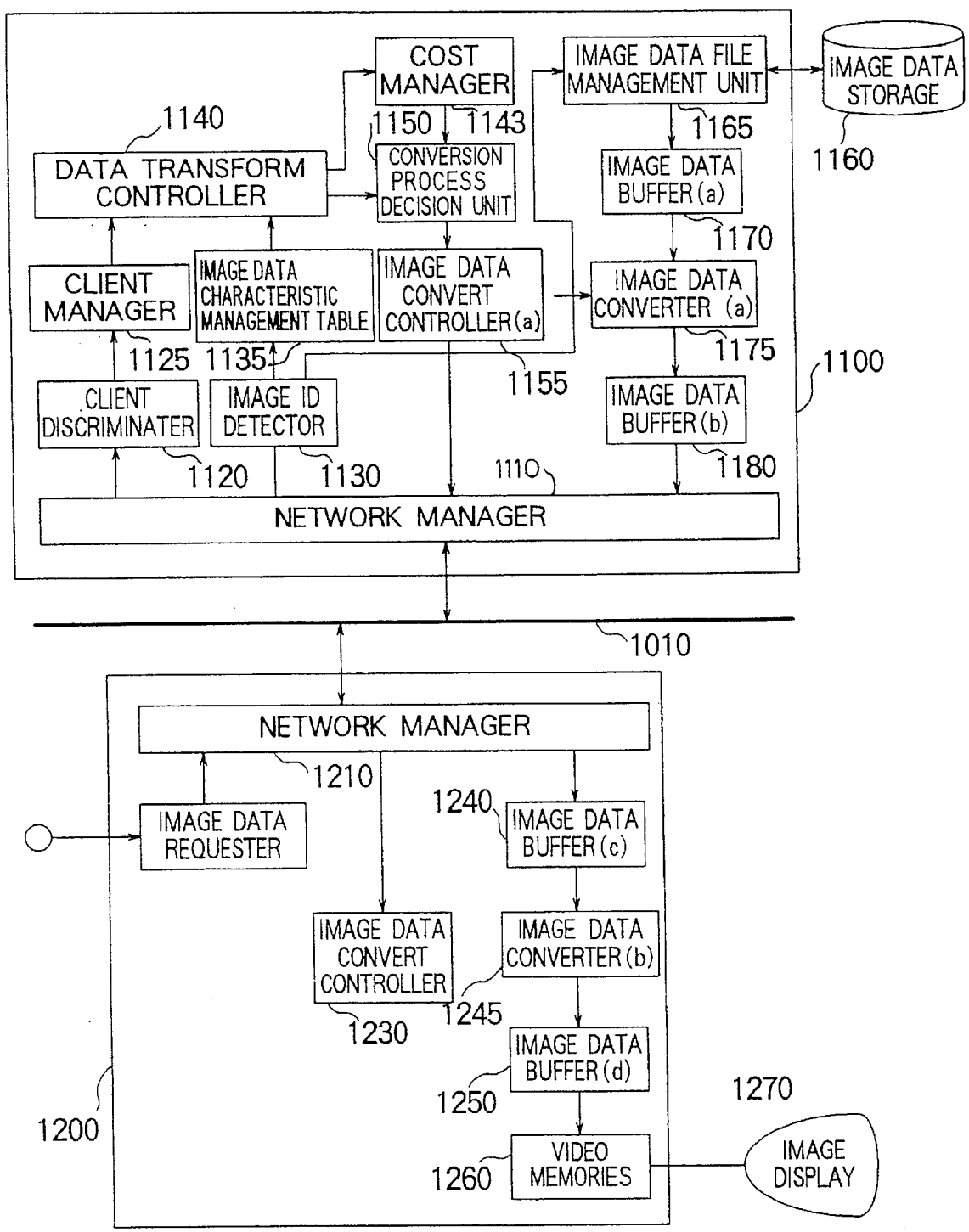
FIG. 14 is a diagram illustrating the basic configuration of a sixth embodiment according to the present invention.

FIG. 14 shows a basic configuration of an apparatus of a sixth embodiment according to the present invention. First of all, description will be given by taking, as an example, the case where a server and a client are provided in a one-to-one correspondence, for brevity. For the purpose of description, each processing executing portion is represented by a hardware block in FIG. 14. In actual configuration, however, it can also be implemented by computer software.

In FIG. 14, numeral 1100 denotes a server (image server), and numeral 1200 denotes a client. Image data are stored in an image data storage 1160 using a magnetic disk or an optical disk, for example. The image data storage 1160 is connected to the server. Image data are transferred via a communication line 1010 in response to a request from the client and displayed on an image display 1270 of the client.

Respective portions will now be described in order from the server side in accordance with FIG. 14.

A network manager 1110 inputs and outputs data via the communication line 1010 in accordance with a predetermined procedure. This corresponds to the network manager 60 shown in FIG. 12 of the fifth embodiment.

Data inputted to the server side includes a client identifier for specifying the connected client and an image ID for specifying an image to be transferred. On the other hand, information outputted from the server to the client includes requested image data, instructions as to contents of conversion to be effected on the client side, and conversion parameters.

On the basis of the client identifier sent from the client, a client discriminator 1120 specifies a client which becomes the subject of transfer. When a client has been specified, specifications of the client are sent from the client manager to a data transform controller 1140 on the basis of ID of the client. Information supplied from the data transform controller 1140 is sent to a cost manager 1153, in which time required for processing is stored for each conversion scheme. Pertinent information is thus outputted. In a conversion procedure decision unit 1150, a conversion procedure is decided.

The portion from the client discrimination to decision of conversion contents may be the same as the procedure of the address detector 65 and the client manager 10 shown in FIG. 12 of the fifth embodiment. In this case, the processing contents of the data transform controller 1140 are close to those of the data format controller 50 shown in FIG. 12. The difference between them will now be described. The server 1100 of the present embodiment has therein a management table of subject data. Therefore, the data transform controller 1140 searches the contents by using image ID subjected to transfer request. Meanwhile, in the fifth embodiment, every attribute information is described in the header attached to the transferred data. In the fifth embodiment, therefore, the header reading unit is separately provided.

The image for which a transfer request has been made is specified by the image ID. The pertinent image data is read out from the image data storage 1160 via an image data file management unit 1165 and recorded into an image data buffer (a) 1170. On the other hand, from an image data characteristic management table 1135 as well, characteristic information of the pertinent image is inputted to the data transform controller 1140 on the basis of the image ID.

As a result, it is possible in the data transform controller 1140 to compare the number of pixels and the number of colors, for example, of the subject image with those of image which can be handled by the client of transfer destination and judge the contents of conversion processing needed to absorb the difference.

In case images are handled in a client server system as described herein, the following eight items are examples which must possibly be converted at the time of data transfer.

(1) Resolution;

(2) The number of display colors;

(3) Color space;

(4) Coding scheme;

(5) Coding parameter;

(6) File format;

(7) Direction of MSB-LSB; and (8) Transfer order of block data.

On the basis of the decided conversion contents and the specified client, it is possible to obtain information as to processing time required to execute individual processing in the server and the client by using a cost table of the cost manager 1153. On the basis of the above described time required for individual conversion and time required for data communication, the conversion procedure decision unit 1150 judges whether each processing should be conducted in the server or client. The time required for communication is derived from the quantity of server output data and the transfer rate of the communication line. For calculating the transfer rate, the scheme used in the typical computer network is employed. If at this time the rate used when the image transfer request has been transferred is detected and used, it is possible to dynamically cope with such a system that a plurality of clients are connected and the network load changes momentarily.

For a portion which should be in charge of the server, an image data converter 1175 is driven by an image data convert controller (a) 1155 in accordance with the decided conversion procedure. The image data converter 1175 effects required conversion on image data recorded in the image data buffer (a) 1170 and outputs resultant data to an image data buffer (b) 1180. Alternatively, two image data buffers 1170 and 1180 may be formed by the same memory. In the first through fifth embodiments, these are formed by a single memory, i.e., the data buffer 90 shown in FIG. 12.

The portion referred to as the image data converter 1175 in the sixth embodiment corresponds to the decoding unit 40 and the coder unit 45 shown in, for example, FIG. 12 of the fifth embodiment, and the color space exchange unit 33 shown in FIG. 10 of the fourth embodiment.

On the other hand, contents of conversion judged to be effected in the client are sent to the client 1200 via the communication line 1010. In the client, an image data convert controller (b) 1230 drives an image data converter (b) 1245 on the basis of a conversion instruction from the server.

In accordance with a predetermined procedure, image data after conversion in the server 1100 has finished is transferred to an image data buffer (c) 1240 included in the client 1200.

The transferred image data is subjected to conversion processing of the client side in the image data converter (b) 1245, outputted to an image data buffer (d) 1250, and further transferred to a video memory 1260. As a result, the image data is displayed in an image display 1270. In the same way as the server 1100, two image data buffers 1240 and 1250 may be formed by the same memory.

An image data requester 1220 in the client 1200 first specifies an image and requests the server 1100 to transfer the image. By using known input means such as a keyboard, an operator inputs information for specifying a necessary image. Thereby, an image ID is transferred from the image data requester 1220 to the server. As a result, the image request is executed.

Flow of a series of processing will now be described by referring to FIGS. 15 and 16.

Figure 15:
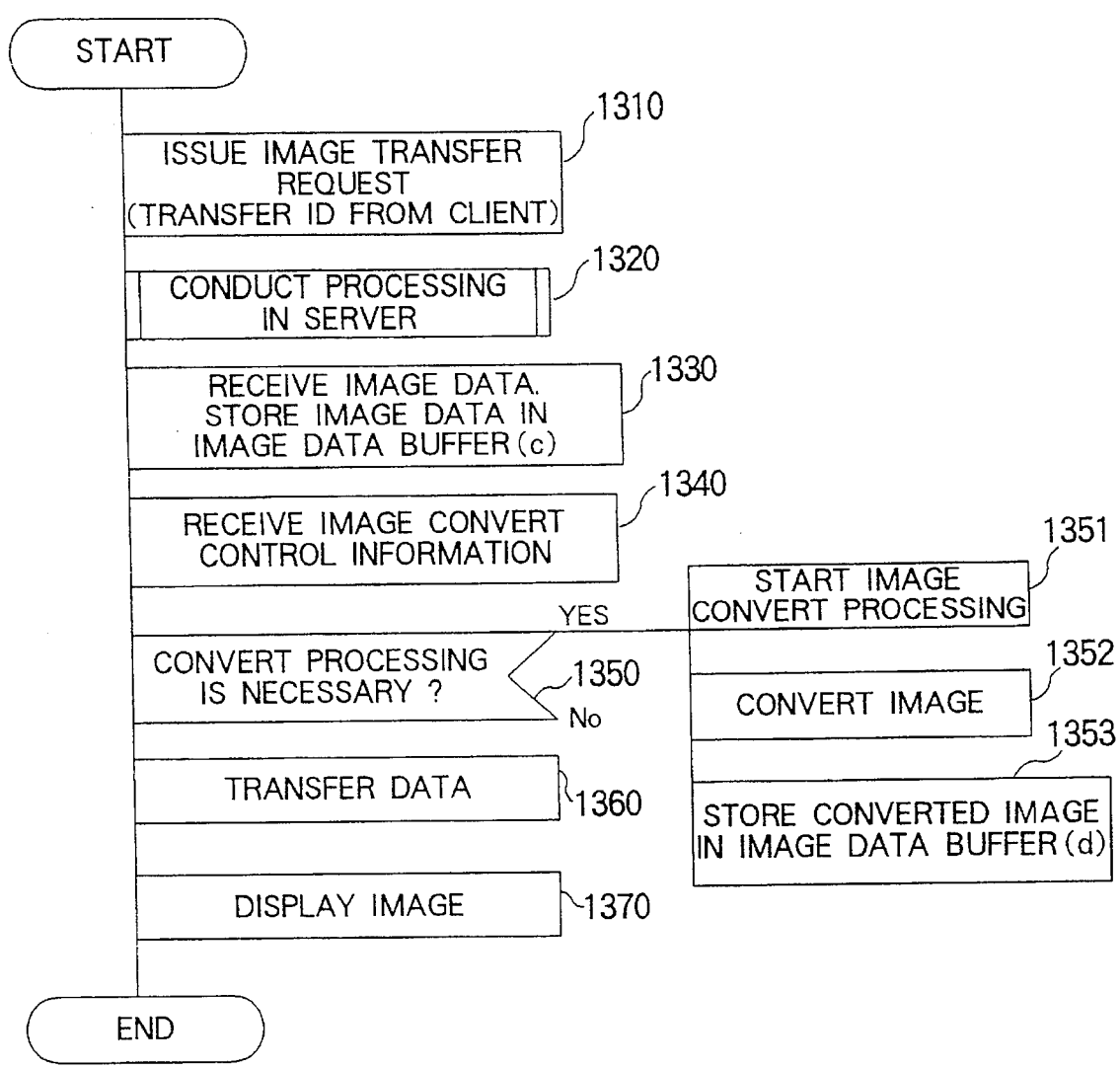
FIG. 15 is a diagram illustrating the flow of the entire image conversion according to the present invention.

FIG. 15 is a diagram showing the processing flow of the client side. First of all, an image transfer request is issued (step 1310). Thereafter, the processing passes to the server (step 1320). Processing returns to the client when image data is transferred (step 1330). The transferred image data is stored temporarily. Contents of convert processing to be effected in the client and parameters needed there are sent from the server as image convert control information (step 1340).

In case every necessary conversion has already been completed in the server, the client transfers data to the video memory (step 1360) without executing conversion. The image is thus displayed.

On the other hand, in case processing must be conducted in the client side as well, the image data converter is started in accordance with the image convert control information (step 1351). Convert processing is effected on the temporarily stored image (step 1352). The result is stored in the image data buffer (d) denoted by 1250 in FIG. 14 (step 1353), and transferred to the video memory 1260. Display is thus completed.

Flow of processing in the server will now be described by referring to FIG. 16.

Upon receiving an image transfer request from the client (step 1410), the server specifies an image file which becomes the subject on the basis of the image ID and reads out an image file from the image data storage 1160 (step 1415). At the same time, information of the pertinent image is decoded and read out from the image data characteristic management table for recording the size of the pertinent image, the number of used colors or calorimetric system, and presence/absence of coding (step 1420). However, characteristics of each image described just now are often recorded beforehand in the image file itself as header information, for example. In that case, it is not necessary to especially preserve a separate file. On the other hand, the client which issued the transfer request in the course of communication procedure has already been specified. At the stage of step 1425 in FIG. 16, discrimination of the client is completed, and client information corresponding to this is decoded and read out (step 1430). Contents of the client information will be described later in detail. By comparing the information of the client read out with the information of the image, contents of necessary conversion processing can be determined (step 1435).

At a stage in which contents of conversion were determined, time required for each conversion processing when each processing is executed in the client and server is decoded from the cost table included in the cost manager (step 1440). Furthermore, time required for data transfer is found, because the quantity of data flowing through the communication line is determined.

The total processing time of the case where each processing is executed in each of the client and server is calculated and compared. Such a combination as to minimize the total processing time is selected. Thereby, optimum allotment of conversion processing can be determined (step 1450).

When required time is calculated, occupation factor of the server must be considered as to the processing capability of the server. Furthermore, since the transfer capability of the communication line changes momentarily, precision of judgment can be improved by making a correction by using the value of transfer rate obtained by known means at the time of image transfer request.

The client is given instructions as to a portion of conversion processing to be executed by the client (step 1460). In addition, conversion processing to be executed by the server is executed (step 1470).

After the conversion has been finished, the converted image data is transferred to the client (step 1475). Alternatively, this transfer may be executed partially before conversion is completely finished.

A method for determining the contents of conversion and determining the conversion procedure, which is a feature of the present embodiment, will now be described. Since the contents of conversion absorbs the difference between the specifications of the client and specifications thereof, comparison between specifications is needed.

Table 1 shows an example of client information management unit in the server.

TABLE 1

Client Information Management Table

| Apparatus ID | Contents of Apparatus | Number of Display Pixels | Number of Display Colors | Coding Scheme Flag |
|---|---|---|---|---|
| 1 | Client A | 640 × 480 Pixels | 256 Colors | Original Image Data |
| 2 | Client B | 1024 × 768 Pixels | 2**24 Colors | JPEG |
| 3 | Client C | 1280 × 1024 Pixels | 2**16 Colors | Individual Scheme 1 |
| 4 | . | . | . | . |
| . | . | . | . | . |
| . | . | . | . | . |
| . | . | . | . | . |

For each apparatus ID, hardware specifications of the apparatus such as the client name, the number of pixels which can be displayed by the client, and the number of colors are registered beforehand. Furthermore, the function which can be executed by software mounted on each apparatus is also recorded. In this case, in an apparatus having ID equivalent to "1", coding and decoding processing cannot be executed at all, and hence image data must be transferred in the form of original image.

On the other hand, information concerning each image data is also managed by the server in the same way. Table 2 shows an example of the image data characteristic management table for that purpose.

TABLE 2

Image Data Characteristic Management Table

| Image ID | Contents of Image Name | Number of Display Pixels | Number of Display Colors | Coding Scheme Flag |
|---|---|---|---|---|
| 1 | Image A | 640 × 480 Pixels | 256 Colors | Original Image Data |
| 2 | Image B | 1024 × 768 Pixels | 2**24 Colors | JPEG |
| 3 | Image C | 1280 × 1024 Pixels | 2**16 Colors | Individual Scheme 1 |
| 4 | . | . | . | . |
| . | . | . | . | . |
| . | . | . | . | . |
| . | . | . | . | . |

For each image, the number of pixels, the number of colors, presence/absence of coding, and coding scheme are registered beforehand. In case of image data, such a scheme that these related information pieces are stored as header information of each image data is also widely used. In that case, a similar effect is obtained without storing such an independent table.

If the resolution and the number of colors which can be displayed on the client side, and the resolution and the number of colors of image data to be displayed become clear, it is possible to determine the contents of processing required to display a certain image in the client.

In case image data having 1280×960 pixels, for example, is to be displayed in a client having an apparatus ID of "1", it is necessary to compress the image to ½ in each of the vertical and horizontal directions. In case a full color image having eight bits for each of R, G and B is to be displayed on a display having 256 colors, conversion referred to as color reducing processing from 24 bits to 8 bits becomes necessary.

Process for judging whether what kind of conversion is necessary will now be described by referring to FIG. 17.

Figure 16:
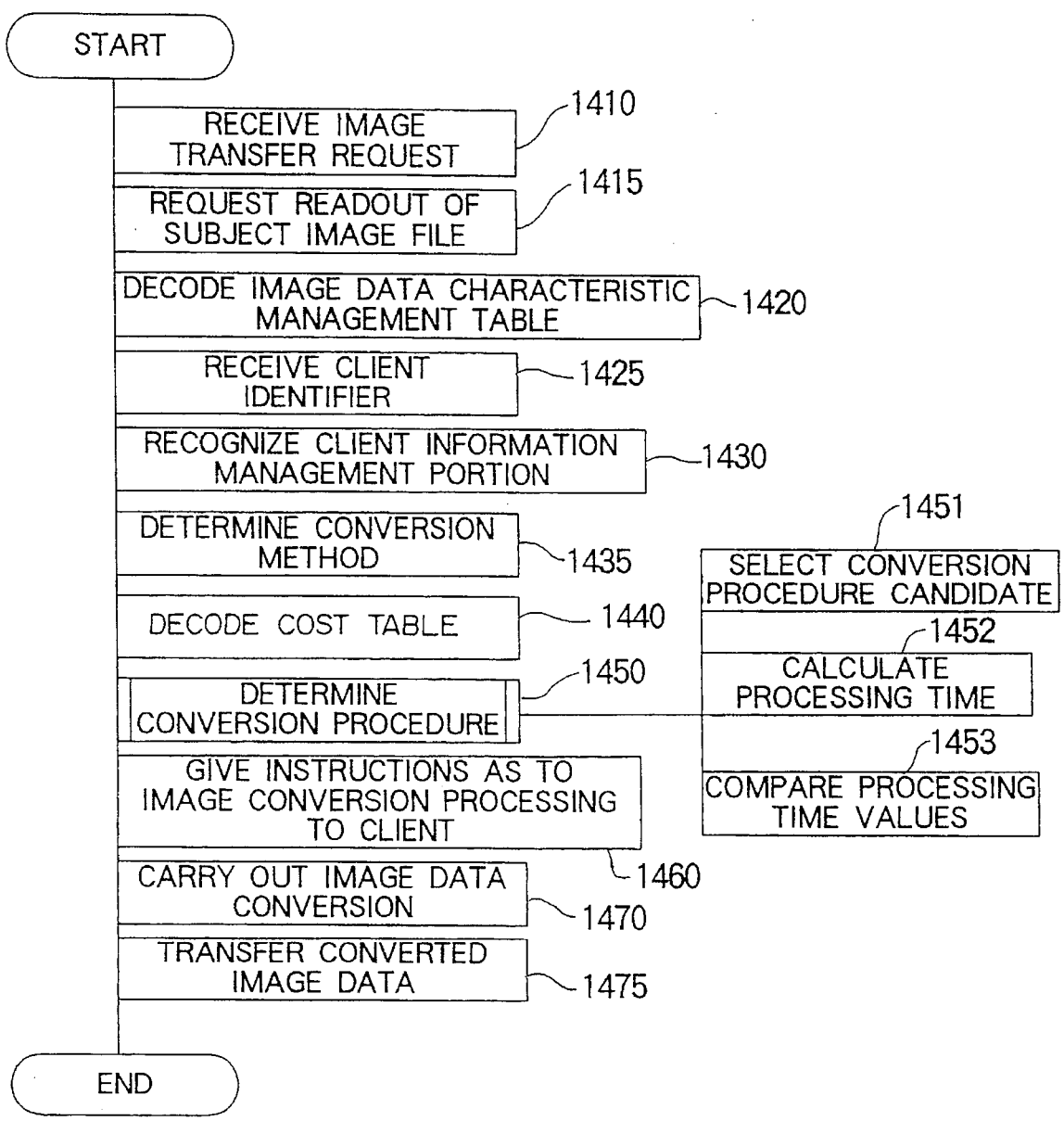
FIG. 16 is a diagram illustrating the flow of processing in a server portion.

This corresponds to contents of the step denoted by 1435 in FIG. 16. In this example, items to be considered are only resolution, the number of colors, and whether data is code data, for brevity. In case there is another study item, it is also included in the same way.

Figure 17:
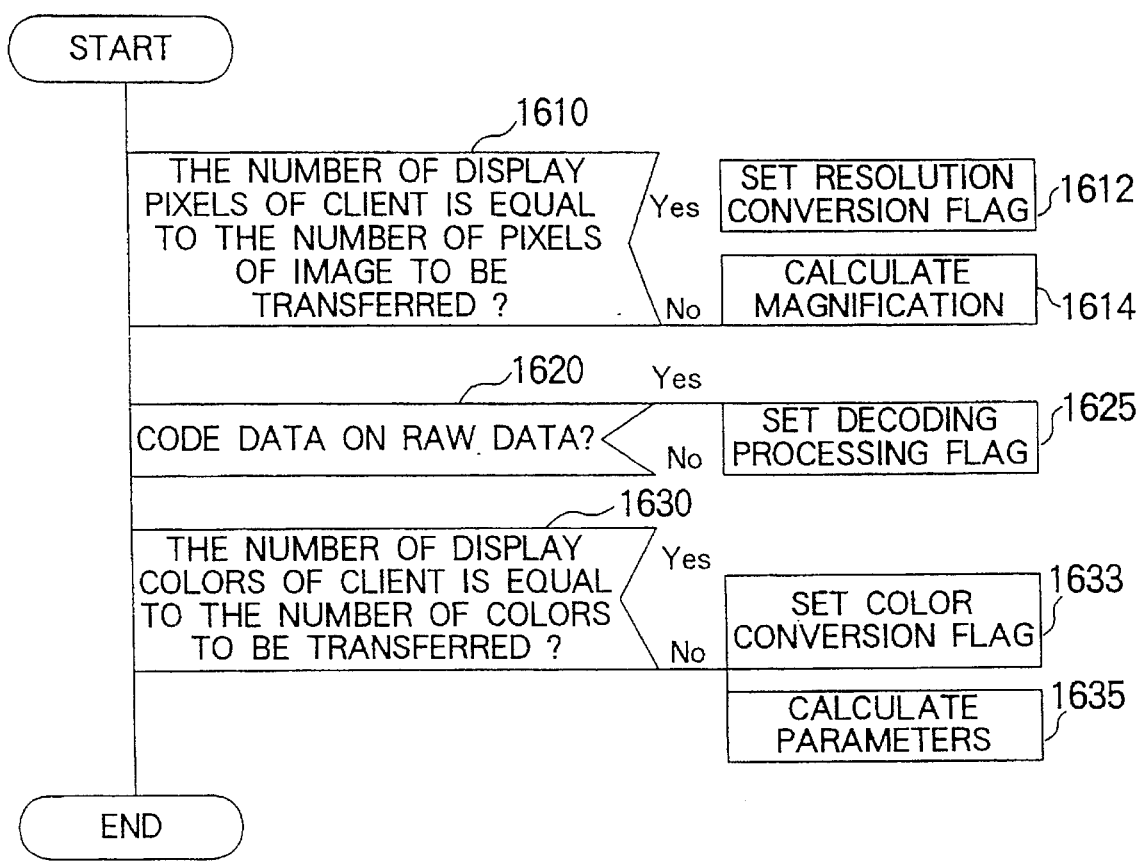
FIG. 17 is a diagram illustrating the flow of processing for judging contents of conversion.

First of all, at step 1610 in FIG. 17, the number of display pixels of the client read out from the client manager is compared with the number of pixels of the pertinent image data obtained from the image data characteristic management table. If there is a difference between them, it is necessary to obtain image data matched with the number of display pixels of the client by effecting resolution conversion processing on the stored image data. If resolution conversion is required, a flag for indicating execution of resolution conversion processing is set (step 1612). By making a comparison between them, magnification is calculated (step 1614). By taking this magnification and size of image data as parameters, resolution conversion processing is executed in the image data converter (a) 1175 or the image data converter (b) 1245 shown in FIG. 14.

It is then judged on the basis of contents of the image data characteristic management table whether the stored image data is code data which has been subjected to coding processing, and if so it is judged which coding scheme has been effected (step 1620). If the data is code data, a decoding processing flag is set (step 1625). This flag means that decoding processing must be effected in the course up to image display. Since there are a plurality of coding schemes, the decoding processing flag includes means allowing to specify the decoding scheme.

Furthermore, the number of colors which can be displayed in the pertinent client is compared with the number of colors of image data (step 1630). It is determined whether color conversion such as color reducing processing or reconfiguration of the color table must be executed, and a flag is set (step 1633). At this time, the flag includes means for specifying the contents of conversion. In addition, parameters are also set at this time as occasion demands (step 1635).

How to determine the conversion procedure for judging in which of the server and client each necessary conversion processing should be executed will now be described. This process is contents of the step denoted by 1450 in FIG. 16.

Figure 18:
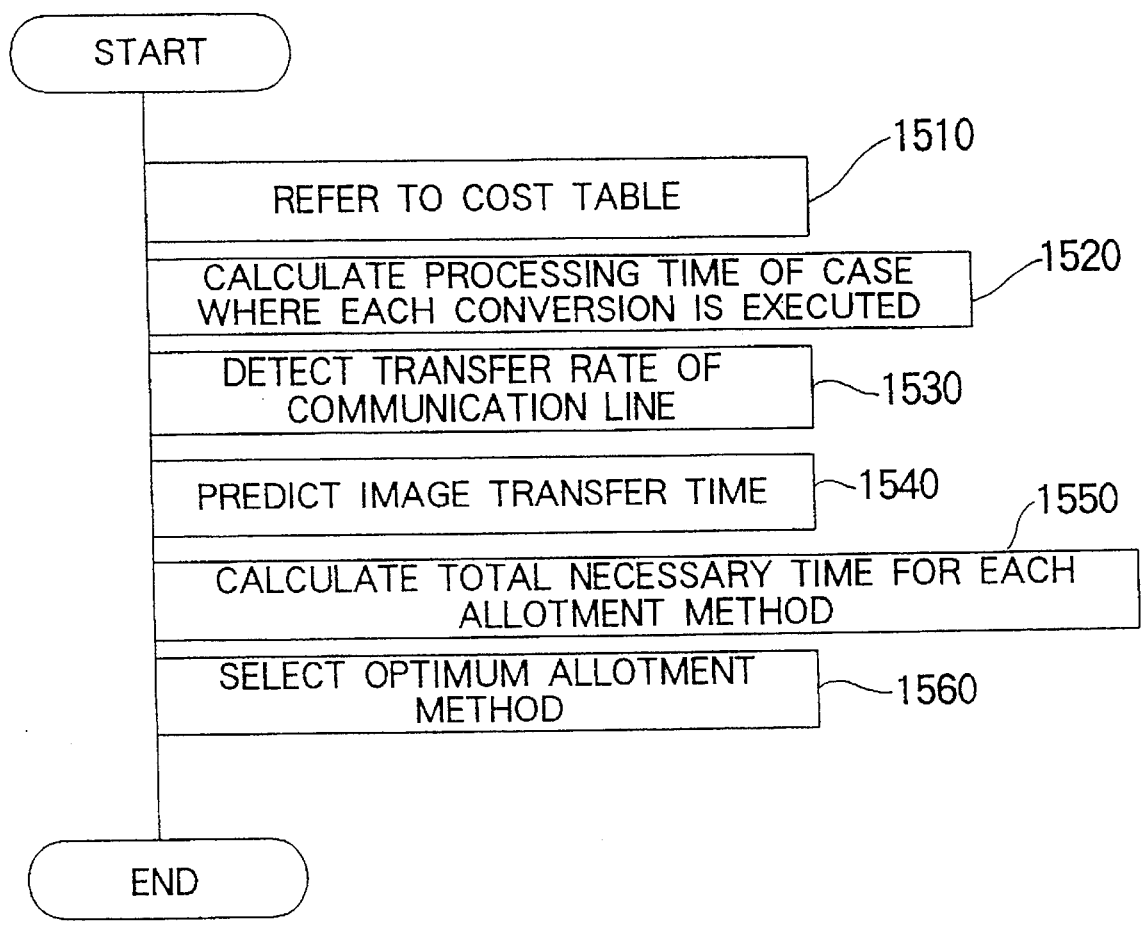
FIG. 18 is a diagram illustrating a method for determining partial charge of individual conversion.

The flow of processing will now be described by referring to FIG. 18.

Description will be given by taking, as an example, the case where resolution conversion and conversion of the number of colors are effected.

First of all, necessary time for conversion processing which must be executed in the server and the pertinent client is read out from the cost table included in the cost table for image processing (step 1510). An example of the cost table is shown in Table 3.

TABLE 3

Cost Table

| Apparatus ID | Apparatus Name | Expansion/Compression Processing | 24 bit–8 bit Display Color Conversion |
|---|---|---|---|
| 0 | Server | $f_1(x_1, y_1, x_2, y_2)$ | $g_1(x_1, y_1)$ |
| 1 | Client 1 | $f_2(x_1, y_1, x_2, y_2)$ | $g_2(x_1, y_1)$ |
| 2 | Client 2 | $f_3(x_1, y_1, x_2, y_2)$ | $g_3(x_1, y_1)$ |
| . | . | . | . |
| . | . | . | . |
| . | . | . | . |

The cost table manages the necessary time of the case where each processing is executed in the server and each client. Since necessary time in image processing typically depends upon contents of input and output images, and especially upon the number of pixels, the necessary time is a function of the number of input pixels $(x_1, y_1)$ or the number of output pixels $(x_2, y_2)$.

From various conditions read out, such as requested image size and the number of pixels of the display, necessary time of the case where the pertinent processing is effected in the server and client is calculated (step 1520). At this time, a plurality of clients are simultaneously connected to the server and are requesting processing sometimes in practical use. Since in this case the processing capability of the server depends upon the occupation factor of an arithmetic processing portion (CPU) of the server, the occupation factor at each time point must be considered for calculation of necessary time as well. As for the method for detecting the occupation factor of the arithmetic processing portion in the server whereto a plurality of clients are connected, a known scheme is used (step 1530).

Furthermore, the time required when data is transferred from the server to the client is predicted (step 1540). This is calculated from the value of transfer rate of a command made clear when an image request has been sent from the client to the server and data quantity at the time of image transfer.

Each necessary time thus calculated is substituted into each item shown in Table 4, for example. Thereby, such a combination that the sum of necessary time values is the shortest is selected. At that time, it is judged whether each processing belongs to the server or client. Thereby, optimization of allotment is attempted (steps 1550 and 1560).

TABLE 4

Method for Judging Optimum Allotment

| | Conversion Executing Apparatus | | Necessary Time | | | |
|---|---|---|---|---|---|---|
| Case | Resolution Conversion | Display Color Conversion | Resolution Conversion | Transfer Time | Display Color Conversion | Total |
| 1 | S | S | $a_1$ | $b_1$ | $c_1$ | $d_1$ |
| 2 | S | Cl | $a_2$ | $b_2$ | $c_2$ | $d_2$ |
| 3 | Cl | Cl | $a_3$ | $b_3$ | $c_3$ | $d_3$ |

S: Server
Cl: Client 1

In the present example, the total necessary time is used as the standard of judgment. In the same way, however, the load of the communication line may be taken as the standard, or the load reduction of client side may be taken as the standard.

In the sixth embodiment of the present invention, the above described means are combined. When image data stored in the server is transferred in response to a request from the client, therefore, it has become possible to effect processing adapted to the number of pixels and the number of display colors of the client and effect data transfer at the highest speed.

Figure 19:
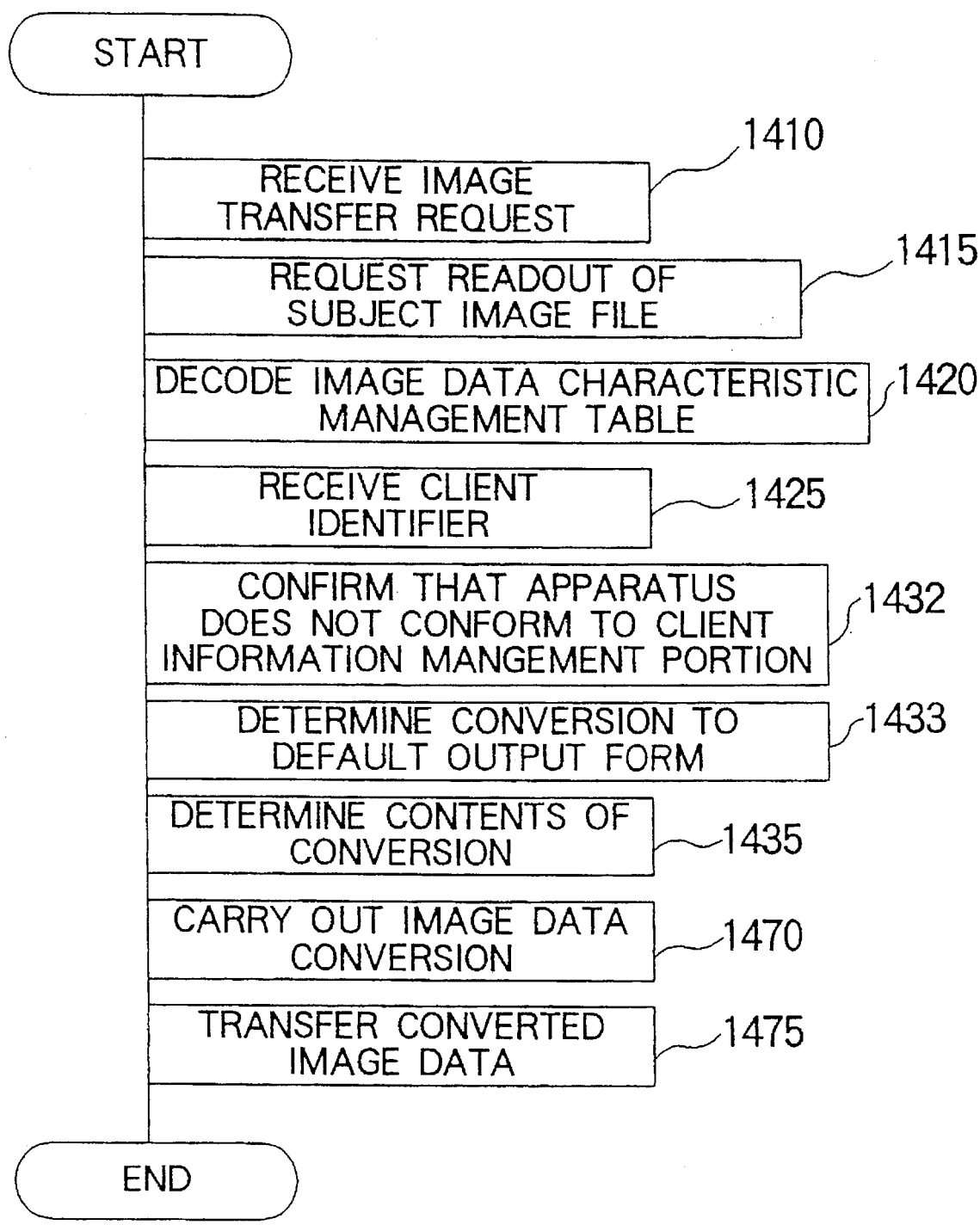
FIG. 19 is a diagram illustrating the flow of processing of the case where a transfer request from an unknown client has come.

As an application example derived from the above described sixth embodiment, there is case where a client is newly connected to the line and management information thereof such as specifications and processing capability is not yet recorded in each management table in the server. An example of flow of processing on the server side when an image transfer request has come from this client will now be described by referring to FIG. 19.

Processing from step 1410 to step 1425 is conducted in the same way as FIG. 16. The client ID is detected. In case the pertinent client is not registered in the client manager, exceptional processing is executed (step 1432). In this case, specific values are set beforehand for the number of outputted pixels and the number of display colors, and conversion for those values is executed (step 1433). Every conversion processing is executed on the server side. As a result, the conversion procedure determining portion (such as the step 1450) shown in FIG. 16 becomes unnecessary, and instructions as to conversion (step 1460) are not given either.

In case a client has been newly increased, the above described optimum processing allotment can be used by registering the new client into respective management tables included in the server.

As another example of application of the sixth embodiment, the case where conversion processing is conducted only in the server will now be described by referring to FIGS. 20 and 21. In this case, only atomization of conversion processing is realized from information of the client and image data. In case a plurality of clients simultaneously send requests to one server via the communication line, the efficiency can be raised by allotting a part of processing to clients. In case the number of clients is small, however, all processing may be executed by the server.

Figure 20:
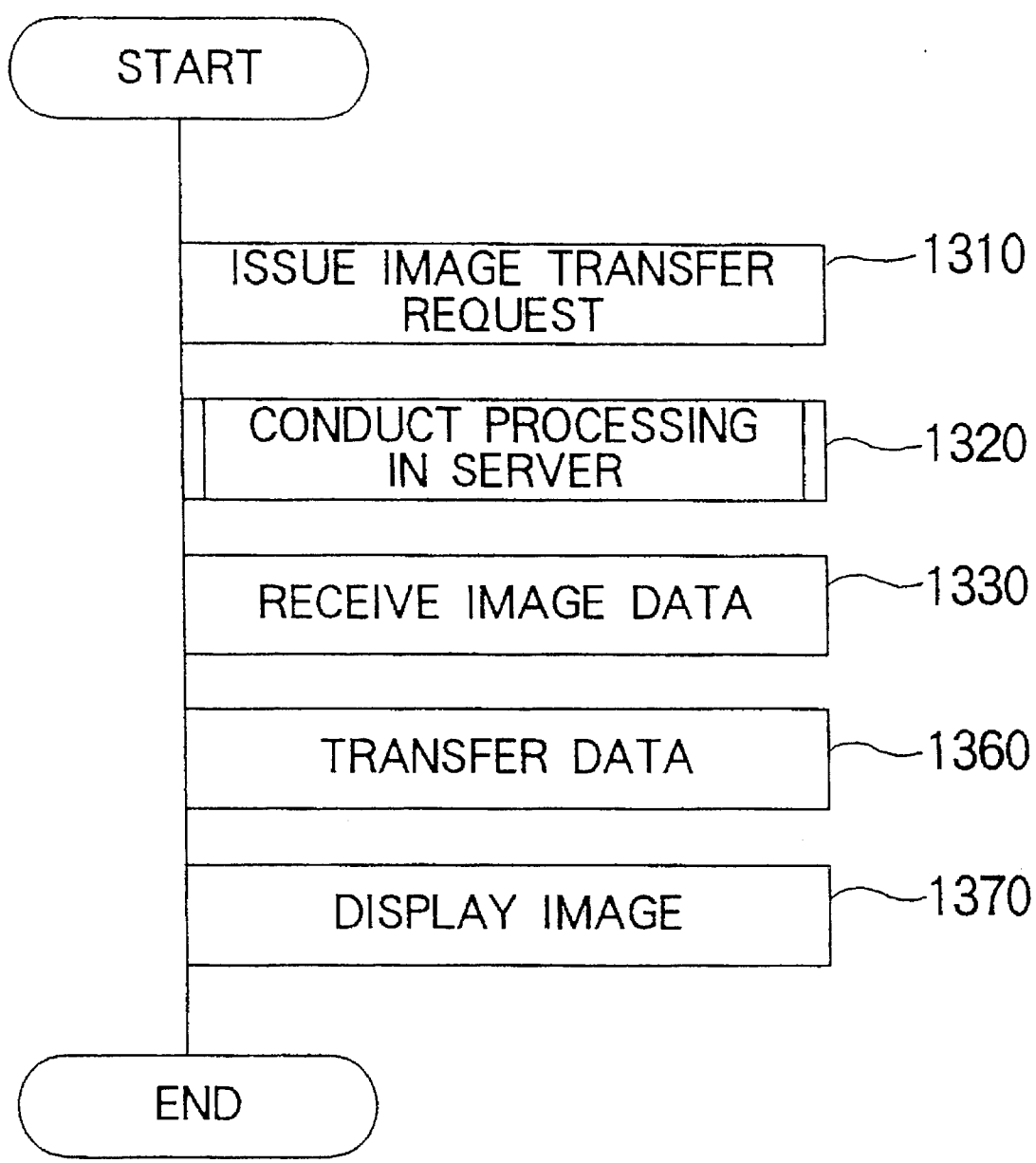
FIG. 20 is a diagram illustrating processing of the case where every conversion is executed on the server side.
Figure 21:
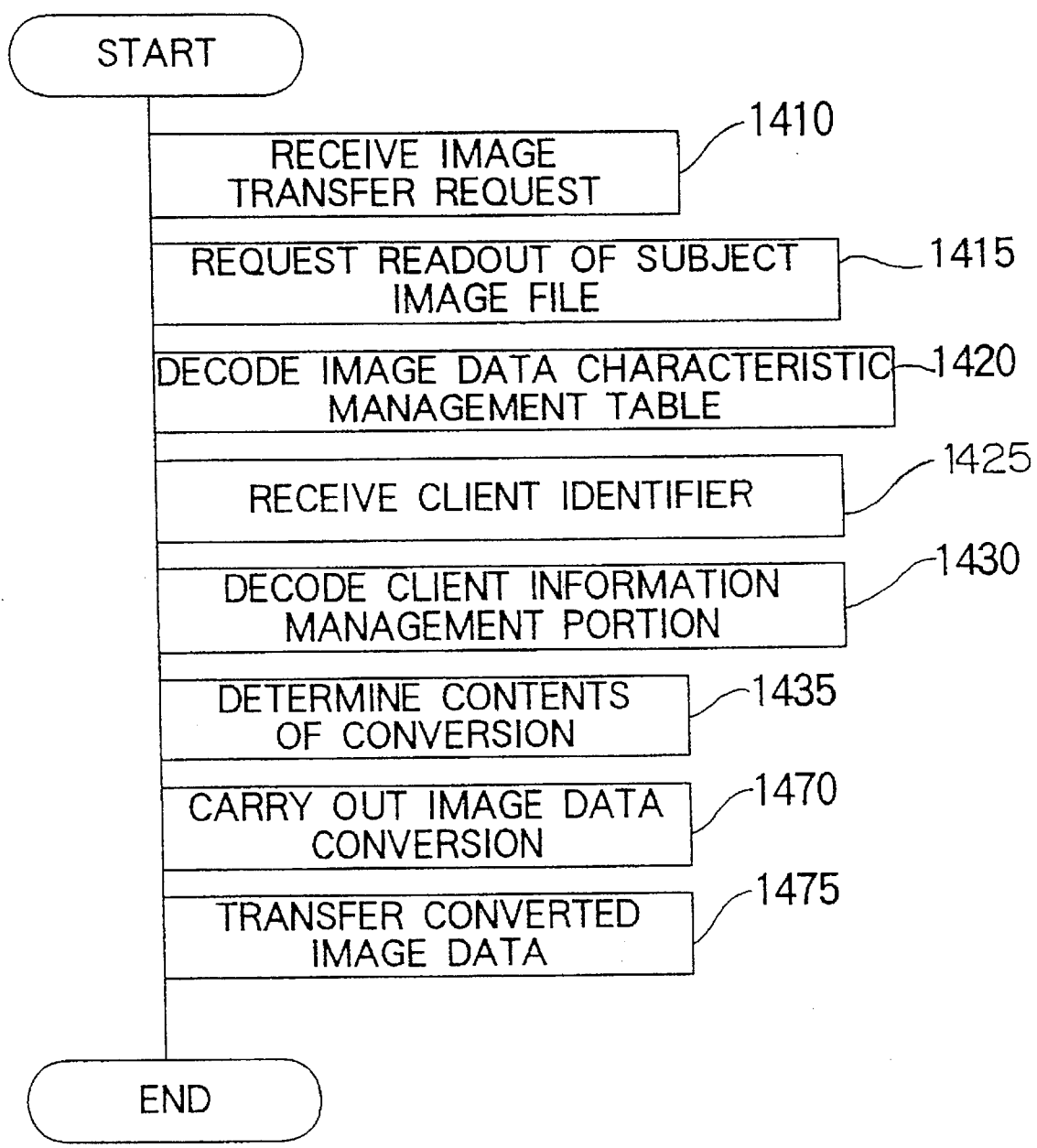
FIG. 21 is a diagram illustrating the flow on the server side under the situation of FIG. 20.

FIG. 20 is a diagram showing the flow of operation of the client side, and it corresponds to FIG. 15.

In this case, all the client does is to send an image transfer request to the server (step 1310), receive image data completed in conversion from the server and display it (steps 1320 through 1370). On the other hand, the server operates in accordance with flow shown in FIG. 21. It is possible to delete the step of determining the conversion procedure represented as the step 1450 in FIG. 16 and step of giving instructions as to image conversion processing in the client.

For brevity of description, the case where an image data storage apparatus is provided separately from a conversion apparatus which is the kernel of the present invention has been described. By providing the storage apparatus itself with the functions or means described herein, however, both apparatuses may be implemented as a single apparatus.

For the purpose of description, the case where functions are implemented by respective parts of the apparatus has been described. By using a personal computer or a work station, for example, however, the same functions as those of the apparatus heretofore described may be implemented. Although flow of processing in that case remains the same as heretofore described, the inside of the apparatus is formed by a CPU and a memory.

In a system having a plurality of computers connected via a network, it is now assumed that when image data stored in a part of the system is transferred to a different apparatus and used, data must be exchanged between apparatuses differing in form, communication procedure, or data coding scheme. In this case, the present invention makes it possible to realize a system in which the operator executes image conversion conformed to specifications of the apparatus of transfer destination without being conscious and, in case image conversion and transfer are to be conducted, conversion can be effected with such a procedure that the efficiency of the entire processing becomes the highest.

The present invention is not limited to image data (still image data), but it can be widely applied to data difficult to code such as moving image data or speech data.

We claim:

1. A data processor for transferring image data stored in image data storing means to an external apparatus, comprising:

means for storing information concerning characteristics of an image and information concerning an external apparatus at a transfer destination;

means for associating said information concerning characteristics of the image with said information concerning the external apparatus at the transfer destination and judging type of conversion required for destination and judging type of conversion required for transfer of image data;

means for converting stored image data in accordance with the type of conversion judged;

cost management means for storing processing time needed to carry out conversion required for transfer of image data in said data processor and processing time needed to carry out conversion required for transfer of image data in said external apparatus at the transfer destination; and means for judging, by referring to said cost management means, which of said data processor and said external apparatus at the transfer destination should carry out conversion required for transfer of image data.

2. A data processor according to claim 1, wherein when simultaneous data transfer requests are made from a plurality of external apparatuses, said judging means calculates, based on processing speeds of said data processor and respective external apparatuses, necessary time values when conversion is carried out in each of said data processor and external apparatuses, and selects a combination to minimize required processing time.

3. A data processor according to claim 1, wherein when simultaneous data transfer requests are made from a plurality of external apparatuses, said judging means selects a combination such that transfer time on a communication line connecting said data processor with each external apparatus at the transfer destination is minimized.

4. A data processor according to claim 1, wherein when simultaneous data transfer requests are made from a plurality of external apparatuses, said judging means calculates, based on processing speeds in said data processor and respective external apparatuses, necessary time values in case conversion is carried out in each of said data processor and external apparatuses, calculates transfer time on a communication line connecting said data processor with each external apparatus of transfer destination, and selects such a combination that the sum of said necessary time and said transfer time is minimized.

5. A client server system including an image server for transferring image data stored in image data storing means to outside, a plurality of clients requesting transfer of image data, and a communication line connected to said image server and said clients, said image server comprising:

network management means for effecting input and output control of data including image data via said communication line in accordance with a predetermined procedure;

means connected to said communication line to specify a client at a transfer destination;

means for specifying an image corresponding to a transfer request from said client;

means for managing image files stored in said image data storing means and reading out an image file concerning the specified image;

first data buffer means for temporarily storing image data of the image file read out;

means for storing information concerning characteristics of images;

means for storing information concerning a plurality of clients;

means for associating information concerning the specified image from said information concerning characteristics of images with information concerning said client at the transfer destination from said information concerning a plurality of clients, and judging a type of conversion to be carried out, with respect to at least one of a number of pixels, a number of display colors, and coding scheme, as conversion required for transfer of image data;

cost management means for storing processing time needed to carry out conversion required for transfer of image data in said image server and processing time needed to carry out conversion required for transfer of image data in said client at the transfer destination;

means for judging, by referring to said cost management means, which of said image server and said client at the transfer destination should carry out conversion required for transfer of image data;

means for converting, in accordance with the type of conversion judged, image data temporarily stored in said first data buffer means; and second data buffer means for temporarily storing the converted image data.

6. A client server system according to claim 5, wherein said client comprises:

network management means for effecting input and output control of data including image data via said communication line in accordance with a predetermined procedure;

means for making a transfer request of image data;

third data buffer means for temporarily storing image data supplied from said image server;

means for converting, in accordance with the type of conversion judged, image data temporarily stored in said third data buffer means when execution, in said client, of conversion required for transfer of image data has been ordered by said image server;

fourth data buffer means for temporarily storing converted image data; and an image display for displaying the stored image data.

7. A data transfer method in a client server system including an image server for transferring stored image data to outside, a plurality of clients requiring transfer of image data, and a communication line connected to said image server and said clients, said data transfer method comprising the steps of:

specifying a client at a transfer destination connected to said communication line;

specifying an image corresponding to a transfer request from said client;

managing image files stored in image data storing means and reading out an image file concerning the specified image;

storing temporarily image data of the image file read out;

storing information concerning characteristics of images and information concerning a plurality of clients;

associating information concerning the specified image from said information concerning characteristics of images with information concerning said client at the transfer destination from said information concerning a plurality of clients, and judging a type of conversion to be carried out, with respect to at least one of a number of pixels, a number of display colors, and coding scheme, as conversion required for transfer of image data;

storing processing time needed to carry out conversion required for transfer of image data in said image server and processing time needed to carry out conversion required of transfer of image data in said client of transfer destination;

judging, by referring to said processing time, which of said image server and said client at the transfer destination should carry out conversion required for transfer of image data; and converting, in accordance with the type of conversion judged, said temporarily stored image data.

* * * * *